United States Patent
Tsukamoto et al.

(10) Patent No.: US 8,422,844 B2
(45) Date of Patent: Apr. 16, 2013

(54) PLASTIC OPTICAL FIBER CABLE AND METHOD OF TRANSMITTING SIGNAL

(75) Inventors: Yoshihiro Tsukamoto, Toyama (JP); Tsuyoshi Kimura, Toyama (JP); Yasushi Fujishige, Otake (JP); Rie Akihara, Otake (JP); Mitsuhiro Matsuo, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 209 days.

(21) Appl. No.: 13/000,633

(22) PCT Filed: Jun. 23, 2009

(86) PCT No.: PCT/JP2009/061406
§ 371 (c)(1),
(2), (4) Date: Mar. 31, 2011

(87) PCT Pub. No.: WO2009/157444
PCT Pub. Date: Dec. 30, 2009

(65) Prior Publication Data
US 2011/0176814 A1    Jul. 21, 2011

(30) Foreign Application Priority Data

Jun. 23, 2008 (JP) .................................. 2008-163116
Jun. 23, 2008 (JP) .................................. 2008-163117

(51) Int. Cl.
*G02B 6/036* (2006.01)
(52) U.S. Cl.
USPC ....................................................... 385/128
(58) Field of Classification Search .................... 385/128
See application file for complete search history.

(56) References Cited

U.S. PATENT DOCUMENTS 7,609,930 B2 * 10/2009 Aoyagi et al. ................ 385/128
8,023,789 B2 *  9/2011 Aoyagi et al. ................ 385/128
(Continued)

FOREIGN PATENT DOCUMENTS

| JP | 10 319281 | 12/1998 |
| JP | 11 242142 |  9/1999 |

(Continued)

OTHER PUBLICATIONS

International Search Report issued Aug. 11, 2009 in PCT/JP09/61406 filed Jun. 23, 2009.

*Primary Examiner* — Sung Pak
(74) *Attorney, Agent, or Firm* — Oblon, Spivak, McClelland, Maier & Neustadt, L.L.P.

(57) ABSTRACT

A plastic optical fiber cable includes: a bare plastic optical fiber including a core formed of a polymer containing a methyl methacrylate unit, and a clad layer including a layer formed of a specific fluorine-containing olefin resin at least in the outermost layer; and a coating layer around the bare plastic optical fiber, the coating layer including a light-shielding coating layer formed of a specific nylon resin composition, a functional coating layer (C) and a functional coating layer (D) in this order, where one of the functional coating layer (C) and the functional coating layer (D) is formed of a resin composition (I) containing a polybutylene terephthalate resin as a major component or an ethylene-vinyl alcohol copolymer as a major component; the other is formed of a specific nylon resin composition (II); and a ratio of the thickness of the functional coating layer (C) to the thickness of the functional coating layer (D) is set to fall within a specific range.

13 Claims, 2 Drawing Sheets

U.S. PATENT DOCUMENTS

| | | | |
|---|---|---|---|
| 2008/0116596 A1* | 5/2008 | Kegasawa et al. | 264/1.29 |
| 2009/0067794 A1* | 3/2009 | Aoyagi et al. | 385/128 |
| 2009/0279837 A1* | 11/2009 | Aoyagi et al. | 385/128 |
| 2012/0114291 A1* | 5/2012 | Yoshida et al. | 385/123 |

FOREIGN PATENT DOCUMENTS

| | | |
|---|---|---|
| JP | 2000 231045 | 8/2000 |
| JP | 2002 55246 | 2/2002 |
| JP | 2003 255202 | 9/2003 |
| JP | 2003 315638 | 11/2003 |
| JP | 2004 226925 | 8/2004 |
| JP | 2007 47371 | 2/2007 |
| JP | 2007 52095 | 3/2007 |
| JP | 2007 316368 | 12/2007 |
| WO | 01 48526 | 7/2001 |
| WO | 2008 038791 | 4/2008 |

* cited by examiner

PLASTIC OPTICAL FIBER CABLE AND METHOD OF TRANSMITTING SIGNAL

TECHNICAL FIELD

The present invention relates to a plastic optical fiber cable having a coating layer of a layered structure, and particularly a highly flexible plastic optical fiber cable excellent in long-term heat resistance under a high-temperature environment, and a method of transmitting a signal by using the plastic optical fiber cable in combination with a visible-light emitting diode having an emission center wavelength in a range of 500 nm or more and 600 nm or less.

BACKGROUND ART

Conventionally, as an optical fiber, a quartz-based optical fiber of excellently transmitting light over a broad wavelength range has been put into practical use primarily for trunk lines. However, the quartz-based optical fiber is expensive and low in processability. Therefore, a plastic optical fiber (hereinafter simply referred to as a "POF") being more inexpensive, light-weight and large in diameter and having favorable features in end-surface processability and easy-to-handle, has been put into practical use of lighting, sensors, or interior wiring such as FA, OA and LAN.

Of them, a POF cable having a coating layer around the periphery of a step-index (SI) type POF, which has a core-clad structure formed of a polymethyl methacrylate (PMMA) as a core material and a fluorine-containing olefin copolymer of a low refraction index as a clad material, enables high-speed data transmission, attains light-weight and a low-cost transmission system and has an electromagnetic noise countermeasure. Because of these advantages, the POF cable has been put into practical use as in-car LAN communication wiring.

When the POF cable as mentioned above is used in a car, since the ambient temperature reaches about 100 to 105° C., it is required for the cable to have excellent heat resistance. In particular, when the cable is laid under a high-temperature environment such as in the proximity of an engine, since oil, electrolyte, and flammable substances such as gasoline are present, the cable must have chemical resistance simultaneously with heat resistance. For this reason, many proposals have been made on a technique using a polyamide resin (nylon resin) excellent in heat resistance and chemical resistance, such as nylon 11, nylon 12, nylon 6/12, nylon 6, nylon 66, and nylon 6/66 as a coating material for the POF cable.

For example, Patent Literature 1 (JP 10-319281A) and Patent Literature 2 (JP 11-242142A) propose a POF cable having a primary coating layer formed of a black polyamide resin and a secondary coating layer formed of a colored polyamide resin around the periphery of a POF, and mention nylon 6, nylon 11 and nylon 12 as the polyamide resin.

Patent Literature 3 (International Publication No. WO01/48526) and Patent Literature 4 (JP 2003-315638A) disclose a POF cable having an adhesion layer, a primary coating layer and a secondary coating layer sequentially formed of a material containing polyamide polymer around the periphery of a bare POF, and mention nylon 6, nylon 66, nylon 11 and nylon 12 as the polyamide polymer.

Patent Literature 5 (JP 2003-255202A) proposes a POF cable having a coating layer formed of a polyamide resin containing a rare metal-based inorganic pigment around the periphery of a bare POF, and mentions polyamide 11, polyamide 12, polyamide 6/12, polyamide 66 and polyamide 66/6 as the polyamide resin. Patent Literature 6 (JP 2004-226925A) proposes a POF cable having a coating layer formed of a polyamide resin containing ultramarine blue inorganic pigment around the periphery of a bare POF, and mentions nylon 11, nylon 12, nylon 6 and nylon 66 as the polyamide resin.

Patent Literature 7 (JP 2000-231045A) describes a POF cable having a primary coating layer formed of a nylon resin having a melting point of 200° C. or less around the periphery of a bare POF and a secondary coating layer formed of e.g., nylon 12 and a vinyl chloride resin, which have an oxygen index of 25 or more, around the primary coating layer.

However, when a polyamide resin (nylon resin) is used as a material for a coating layer of a POF cable, the following problems are raised.

Generally, a polyamide resin such as nylon 12 is industrially obtained by a polycondensation reaction between an amine and a carboxylic acid. However, since the polymerization of a polyamide resin is a chemical equilibrium reaction, a monomer and an oligomer derived from raw materials for the polyamide resin inevitably remain in the resultant polymer.

According to the studies of the present inventors, as described in the above Patent Literatures, when a POF cable having a primary coating layer formed of a polyamide 11 resin, a polyamide 12 resin, or a polyamide 6-12 resin in contact with a bare POF or a secondary coating layer formed of these polyamide resins is placed in a high-temperature environment of 100° C. or more for a long period of time, a phenomenon where transmission loss of POF significantly increases was observed.

The present inventors have analyzed the cause of the phenomenon in detail. As a result, we found that the reason why transmission loss of a POF cable increases under a high-temperature (or high temperature and high humidity) environment is that a low-molecular weight compound contained in a coating material migrates into a bare POF and increases the Rayleigh scattering, and that oxygen in the environment where the POF cable is placed passes through the coating material, permeates and diffuses in the bare POF to cause oxidative degradation, increasing electron transition absorption.

Furthermore, some reports describe that when a nylon resin such as nylon 66 having a relative high melting point is applied onto the periphery of a POF as a coating, excessive stress is applied to the POF, significantly diminishing optical performance of the POF. For example, Patent Literature 7 (JP 2000-231045A) discloses a POF cable having a primary coating material of a nylon 66 resin directly provided around the periphery of a POF in Comparative Examples (Comparative Examples 2 and 8) carried out in comparison with the invention proposed. In the POF cable, since polyamide 66 resin of a high melting point is directly applied to the periphery of a bare POF at a high coating temperature, the outer shape of the POF varies and transmission loss increases. Thus a high-melting point nylon resin is described to be unsuitable as a coating material for a POF.

Moreover, in the case where a nylon resin having a high bending-elastic modulus such as nylon 66 is applied to the periphery of a POF as a coating, processability and handling of the POF cable become difficult when it is laid and a plug (ferrule) is provided. Damage to the POF cable increased and productivity decreased, in some cases.

To solve an increase in transmission loss under a high-temperature environment as mentioned above as a problem, the following proposals are made. For example, Patent Literature 8 (International Publication No. WO08/38791) proposes a POF cable having a protective coating layer, a light-shielding coating layer and a functional coating layer provided in this order to the periphery of a bare POF. As a material for use in the functional coating layer, a nylon resin composition containing a predetermined flame retardant and a chromatic inorganic pigment, and containing at least one of nylon 6 and nylon 66 as a major component, the composition having a melting point within a predetermined range, and a nylon resin composition containing nylon 66 as a major component, the composition having a melting point and an oxygen transmission rate within predetermined ranges are described. The Patent Literature further describes that the POF cable having such a functional coating layer is excellent in heat resistance particularly in a short wavelength region of 500 to 600 nm. Moreover, a method of transmitting a signal by using the POF cable in combination with a visible-light emitting diode having an emission center wavelength in a range of 500 to 600 nm is proposed.

However, when a nylon resin having a high bending-elastic modulus such as nylon 66 is applied to the periphery of a bare POF as a coating, processability and handling of the POF cable become difficult when it is laid and a plug (ferrule) is provided. Damage to the POF cable increased and productivity decreased, in some cases.

CITATION LIST

Patent Literature

Patent Literature 1: JP 10-319281A
Patent Literature 2: JP 11-242142A
Patent Literature 3: International Publication No. WO01/48526
Patent Literature 4: JP 2003-315638A
Patent Literature 5: JP 2003-255202A
Patent Literature 6: JP 2004-226925A
Patent Literature 7: JP 2000-231045A
Patent Literature 8: International Publication No. WO08/38791

SUMMARY OF INVENTION

Technical Problem

An object of the present invention is to provide a plastic optical fiber cable having little increase in transmission-loss under a high-temperature environment, and being excellent in long-term heat resistance, highly flexible and easily handled, and to provide a method of transmitting a signal using this cable.

Solution to Problem

According to one aspect of the present invention, there is provided a plastic optical fiber cable comprising:
a bare plastic optical fiber comprising a core and a clad layer formed around the core, the clad layer being formed of one or two or more layers; and
a coating layer around the bare plastic optical fiber,
wherein the core comprises polymethyl methacrylate or a copolymer containing a methyl methacrylate unit as a major component;
the clad layer comprises, at least in the outermost layer, a layer comprising a fluorine-containing olefin resin containing a tetrafluoroethylene unit, the resin having a heat of crystal fusion of 40 mJ/mg or less as measured using differential scanning calorimetry (DSC);
the coating layer comprises a light-shielding coating layer, a first functional coating layer (C) and a second functional coating layer (D) in this order from the interior;
the light-shielding coating layer is formed of a resin composition comprising at least one nylon resin of nylon 11 and nylon 12 as a major component, a total content of a monomer and an oligomer that are derived from the nylon resin being 1.5% by mass or less;
one of the first functional coating layer (C) and the second functional coating layer (D) is formed of a first resin composition (I) and the other is formed of a second resin composition (II);
the first resin composition (I) is a resin composition comprising a polybutylene terephthalate resin or an ethylene-vinyl alcohol copolymer as a major component;
the second resin composition (II) is a nylon resin composition having a crystalline melting point in a range of 240° C. or more and 280° C. or less as measured using differential scanning calorimetry (DSC), and an oxygen transmission rate P ($cm^3 \cdot cm/(cm^2 \cdot sec \cdot Pa)$) as measured using a method defined in ISO14663-2:1999 (Annex C) at a temperature T (K), said P satisfying the following general formula (1):

$$P < 8 \times 10^{-2} \times \exp(-5600/T) \quad (1),$$

the nylon resin composition being colorless or colored with an inorganic pigment;
in the case where the first functional coating layer (C) is formed of the resin composition (I) and the second functional coating layer (D) is formed of the resin composition (II), the thickness c (μm) of the first functional coating layer (C) and the thickness d (μm) of the second functional coating layer (D) satisfy the following general formula (2):

$$0.39 \leq c/(c+d) \leq 0.9 \quad (2); \text{ and}$$

in the case where the first functional coating layer (C) is formed of the resin composition (II) and the second functional coating layer (D) is formed of the resin composition (I), the thickness c (μm) of the first functional coating layer (C) and the thickness d (μm) of the second functional coating layer (D) satisfy the following general formula (3):

$$0.15 \leq c/(c+d) \leq 0.7 \quad (3).$$

The above plastic optical fiber cable may have a protective coating layer between the bare plastic optical fiber and the light-shielding coating layer. The protective coating layer is preferably formed of at least one resin selected from the group consisting of a methyl (meth)acrylate resin, a styrene resin, a vinylidene fluoride homopolymer, a polybutylene terephthalate resin, a copolymer containing an ethylene unit and a vinyl alcohol unit.

Furthermore, according to another aspect of the present invention, there is provided a method for transmitting a signal by using the above plastic optical fiber cable in combination with a visible-light emitting diode having an emission center wavelength in a range of 500 nm or more and 600 nm or less.

Advantageous Effects of Invention

According to the present invention, it is possible to provide a plastic optical fiber cable having little increase in transmission-loss under a high-temperature environment, and being excellent in long-term heat resistance, highly flexible and easily handled, and to provide a method of transmitting a signal using this cable.

DESCRIPTION OF EMBODIMENTS

Preferred embodiments of the plastic optical fiber (POF) cable according to the present invention will be described below.

First of all, respective elements of a POF cable according to each embodiment of the present invention will be described.

[Basic Structure of POF Cable]

Figure 1A:
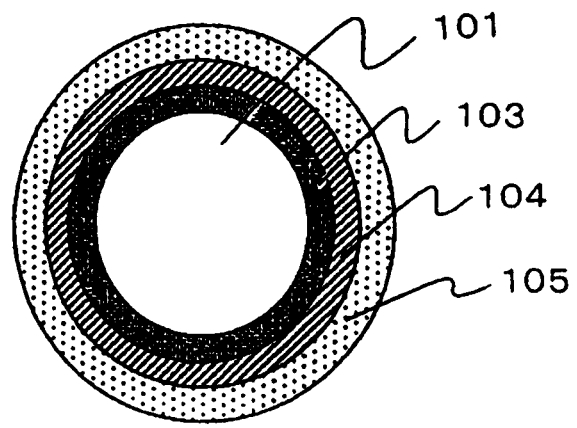
FIG. 1A is a sectional view of an example of a plastic optical fiber cable according to the present invention.

A POF cable according to an embodiment of the present invention, as shown in FIG. 1A, includes a bare POF 101 having a core-clad structure including a core and at least one clad layer formed around the periphery of the core, and a coating layer provided around the periphery of the bare POF, the coating layer being composed of a light-shielding coating layer 103, a functional coating layer (C) 104 and a functional coating layer (D) 105, provided in this order from the interior.

Figure 1B:
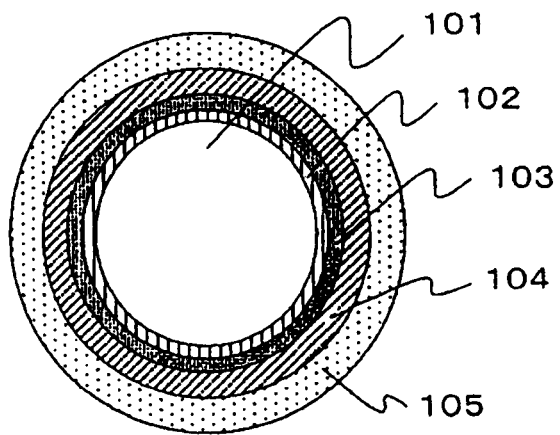
FIG. 1B is a sectional view of another example of a plastic optical fiber cable according to the present invention.

Between the bare POF 101 and the light-shielding coating layer 103, a protective coating layer may be provided. To be more specific, a POF cable according to another embodiment of the present invention, as shown in FIG. 1B, includes a bare POF 101 having a core-clad structure including a core and at least one clad layer formed around the periphery of the core, and a coating layer provided around the periphery of the bare POF, the coating layer being composed of a protective coating layer 102, a light-shielding coating layer 103, a functional coating layer (C) 104 and a functional coating layer (D) 105, provided in this order from the interior.

[Bare POF]

In the POF cable according to the present invention, a material (core material) used for the core of the bare POF is not particularly limited; however, in view of satisfying long-term heat resistance at about 105° C., polymethyl methacrylate (PMMA) or a copolymer containing a methyl methacrylate (MMA) unit as a major component is preferable (hereinafter, these will be referred to as a PMMA resin). As the copolymer, a copolymer composed of a methyl methacrylate (MMA) unit and at least one vinyl-based monomer unit is preferable. Of the PMMA resins, PMMA excellent in balance between transparency and mechanical strength is particularly preferable. When the core material is a copolymer containing an MMA unit as a major component, in view of sufficiently ensuring transparency, the content of the MMA unit is preferably 50% by mass or more, more preferably 60% by mass or more, and further preferably 70% by mass or more. As a copolymerization component for MMA, a component conventionally proposed as a raw-material for a POF core material, such as a methacrylate and an acrylate can be appropriately selected.

The clad to be formed around the periphery of the core may be formed of a single layer or two or more layers. The clad has a layer composed of a fluorine-containing olefin resin as at least the outermost layer, in view of mechanical properties, heat resistance, chemical resistance and impact resistance, for serving as a protecting material for the core or the inner clad layer, as well as in view of optical characteristics including a low refractive index to the extent that an optical loss during bending can be sufficiently reduced. As the fluorine-containing olefin resin, a fluorine-containing olefin polymer having at least a tetrafluoroethylene (TFE) unit and a heat of crystal fusion of 40 mJ/mg or less, is used.

Examples of the fluorine-containing olefin polymer containing a TFE unit include, but not limited to, a copolymer obtained by copolymerizing a TFE unit and at least one of a vinylidene fluoride (VdF) unit, a hexafluoropropylene (HFP) unit and a perfluoro(fluoro)alkylvinylether (FVE) unit; a copolymer of a VdF unit, a TFE unit and a hexafluoroacetone unit; and a copolymer of a TFE unit, a HFP unit and an ethylene unit. As a copolymerization component for TFE, a VdF unit, a HFP unit or an FVE unit is particularly preferable in view of cost, transparency and heat resistance.

Furthermore, a fluorine-containing olefin polymer containing a TFE unit further containing at least one of a VdF unit and an HFP unit is preferable in view of excellent stability during melt spinning of POF.

Specific examples of the aforementioned fluorine-containing olefin polymer containing a TFE unit include a bipolymer composed of a VdF unit (60 to 90% by mass) and a TFE unit (10 to 40% by mass); a terpolymer composed of a VdF unit (10 to 60% by mass), a TFE unit (20 to 70% by mass) and an HFP unit (5 to 35% by mass); a terpolymer composed of a VdF unit (5 to 25% by mass), a TFE unit (50 to 80% by mass) and an FVE unit (5 to 25% by mass); a terpolymer composed of an ethylene unit (5 to 60% by mass), a TFE unit (25 to 70% by mass) and an HFP unit (5 to 45% by mass); a quaterpolymer composed of a VdF unit (10 to 30% by mass), a TFE unit (40 to 80% by mass) and an HFP unit (5 to 40% by mass) and an FVE unit (0.1 to 15% by mass); a biopolymer composed of a TFE unit (40 to 90% by mass) and an FVE unit (10 to 60% by mass); and a bipolymer composed of a TFE unit (30 to 75% by mass) and an HFP unit (25 to 70% by mass).

As the FVE unit, a unit of at least one compound selected from the group consisting of $CF_2=CFOCF_3$, $CF_2=CFOCF_2CF_3$, $CF_2=CFOCF_2CF_2CF_3$, $CF_2=CFOCH_2CF_3$, $CF_2=CFOCH_2CF_2CF_3$, $CF_2=CFOCH_2CF_2CF_2CF_3$, $CF_2=CFOCH_3$, $CF_2=CFOCH_2CH_3$ and $CF_2=CFOCH_2CH_2CH_3$ is preferable since a raw material can be obtained at low cost.

Furthermore, in the present invention, as a fluorine-containing olefin polymer forming at least the outermost layer of a clad, it is necessary to use a resin having a value of heat of crystal fusion as measured using differential scanning calorimetry (DSC) of 40 mJ/mg or less, preferably 20 mJ/mg or less and more preferable 15 mJ/mg or less. When the heat of crystal fusion is extremely high, particularly beyond 40 mJ/mg, the crystallinity of a resin becomes high and the transparency of the resin decreases under a high-temperature environment, causing an increase in transmission-loss of a POF cable in the initial time and under a high-temperature environment. As the fluorine-containing olefin polymer constituting at least the outermost layer of a clad, a resin having a heat of crystal fusion falling within the aforementioned range, for example, 1 mJ/mg or more, can be used.

When the clad is formed of a plurality of layers, as the resin forming a clad layer on the interior side, i.e., an inner clad layer, a material proposed as a POF clad material, such as a fluorinated methacrylate polymer and a vinylidene fluoride polymer can be appropriately selected. A fluorinated methacrylate polymer is particularly preferable since it is a polymer whose refractive index is easily controlled, the polymer being excellent in flexibility and processability while having satisfactory transparency and heat resistance.

As the fluorinated methacrylate polymer, more specifically, as a polymer excellent in flexibility and processability while having satisfactory transparency and heat resistance, a copolymer composed of 15 to 90% by mass of a fluorinated alkyl ester of (meth)acrylic ester unit (A) represented by the following general formula (7):

$$CH_2=CX-COO(CH_2)_m-R_{1f} \quad (7)$$

(where X represents a hydrogen atom, a fluorine atom or a methyl group; $R_{1f}$ represents a (fluoro)alkyl group having 1 to 12 carbon atoms; and m represents an integer of 1 or 2) and 10 to 85% by mass of a monomer unit (B) copolymerizable with the monomer of the unit (A), and having a refractive index within the range of 1.39 to 1.475, can be used.

Examples of the fluorinated alkyl ester of (meth)acrylic acid unit (A) include, but not particularly limited to, units of 2,2,2-trifluoroethyl (meth)acrylate (3FM), 2,2,3,3-tetrafluoropropyl (meth)acrylate (4FM), 2,2,3,3,3-pentafluoropropyl (meth)acrylate (5FM), 2,2,3,4,4,4-hexafluorobutyl (meth)acrylate (6FM), 1H,1H,5H-octafluoropentyl (meth)acrylate (8FM), 2-(perfluorobutyl)ethyl (meth)acrylate (9FM), 2-(perfluorohexyl)ethyl (meth)acrylate (13FM), 1H,1H,9H-hexadecafluorononyl (meth)acrylate (16FM), 2-(perfluorooctyl)ethyl (meth)acrylate (17FM), 1H,1H,11H-(icosafluoroundecyl) (meth)acrylate (20FM) and 2-(perfluorodecyl)ethyl (meth)acrylate (21FM).

On the other hand, examples of the monomer unit (B), copolymerizable with the monomer of the unit (A) include, but not particularly limited to, units of compounds such as alkyl (meth)acrylates including methyl (meth)acrylate, ethyl (meth)acrylate and butyl (meth)acrylate, and a (meth)acrylic acid.

Of these, one or more compound satisfying transparency and heat resistance as a clad material may be appropriately selected. Of them, methyl (meth)acrylate is preferable because if it is copolymerized with a fluorinated alkyl (meth)acrylate, not only the transparency and heat resistance of a clad material but also mechanical strength thereof can be improved in a balanced manner. Furthermore, if a methacrylic acid unit is contained in a fluorinated methacrylate polymer in an amount within the range of 0.5 to 5% by mass, adhesion both to a core material and to the resin of the outermost clad layer of a POF can be improved.

In the case where a POF having a low bending loss is required, a copolymer composed of 10 to 40% by mass of a 2-(perfluorooctyl)ethyl (meth)acrylate (17FM) unit; 40 to 90% by mass of at least one of a 2,2,2-trifluoroethyl (meth)acrylate (3FM) unit, a 2,2,3,3-tetrafluoropropyl (meth)acrylate (4FM) unit and a 2,2,3,3,3-pentafluoropropyl (meth)acrylate (5FM) unit; and 0 to 20% by mass of a methyl methacrylate unit, and having a refractive index within the range of 1.39 to 1.43, is preferable.

In the case where a POF having a high transmission band is required, a copolymer composed of 15 to 30% by mass of at least one of a 2,2,2-trifluoroethyl (meth)acrylate unit (3FM), a 2,2,3,3-tetrafluoropropyl (meth)acrylate unit (4FM) and a 2,2,3,3,3-pentafluoropropyl (meth)acrylate unit (5FM) and 70 to 95% by mass of a methyl methacrylate unit, and having a refractive index within the range of 1.45 to 1.475, is preferable.

Note that, as described above, the clad layer may be formed of a plurality of layers (two or more layers); however, in view of reducing manufacturing cost, it is preferable to provide a first clad alone as the inner clad between the outermost clad layer and a core, thereby forming a two layer structure having the first clad and a second clad layer in the periphery thereof as the outermost clad layer.

[Protective Coating Layer]

Next, the protective coating layer of the POF cable according to the present invention will be described.

In the POF cable according to the present invention, in view of preventing a monomer and/or an oligomer from migrating into the bare POF, it is preferred to provide a protective coating layer between the bare POF and the light-shielding coating layer. The monomer and the oligomer are derived from a raw material, and a nylon resin forming a light-shielding coating layer (described later) contains the monomer and/or the oligomer. For example, if a nylon resin in the resin composition forming the light-shielding coating layer is nylon 12, a raw material for forming nylon 12, i.e., lauryl lactam, migrates into the bare POF. By the presence of the protective coating layer provided between the bare POF and the light-shielding coating layer, the amount of lauryl lactam migrating into the bare POF can be reduced. In this manner, it is possible to prevent transmission loss, particularly, on a short wavelength side, from getting worse.

The melt-flow index (MI)(the amount (g) of polymer ejected from a nozzle of 2 mm in diameter, 8 mm in length, in 10 minutes, in the conditions: a temperature of 210° C. and a load of 5 kgf (49N)) of a resin forming the protective coating layer is not particularly limited; however, it preferably falls within the range of 5 to 200. If MI is extremely low, the molding stability in forming a coating layer decreases and the pressure of a resin applied to a bare POF within a crosshead increases, with the result that the optical characteristics of a POF cable may deteriorate. Conversely, if MI is extremely large, mechanical strength and uniformity in thickness of a protective coating layer tend to decrease.

The resin forming the protective coating layer is at least one type of resin selected from a methyl (meth)acrylate resin, a styrene resin, a vinylidene fluoride homopolymer, a polybutylene terephthalate resin and a copolymer containing an ethylene unit and a vinyl alcohol unit.

As the methyl (meth)acrylate resin, resins known in the art can be used. Examples thereof include a methyl (meth)acrylate homopolymer (PMMA), a copolymer of methyl (meth)acrylate and at least another monomer. The content of a methyl (meth)acrylate unit in the methyl (meth)acrylate resin is preferably 10% by mass or more, more preferably 50% by mass or more, and further preferably 60% by mass or more.

Examples of the copolymerization component for the methyl (meth)acrylate unit include ethyl (meth)acrylate, isopropyl (meth)acrylate, n-propyl (meth)acrylate, tert-butyl (meth)acrylate, n-butyl (meth)acrylate and other alkyl (meth)acrylates; and further include fluorinated alkyl (meth)acrylate represented by the following general formula (8):

[Chemical formula 1]

$$CH_2=CX-COO(CH_2)_m(CF_2)_nY \quad (8)$$

(where X represents a hydrogen atom or a methyl group; Y represents a hydrogen atom or a fluorine atom; m represents an integer of 1 or 2; and n represents an integer of 1 to 12)

Note that, in the above general formula (8), if the structure of a fluorine-containing alkyl group becomes bulky, the degree of polymerization during copolymerization and the heat resistance of a copolymer decrease. Therefore, the fluorine-containing alkyl group preferably has 1 to 12 carbon atoms.

Examples of the fluorinated alkyl (meth)acrylate represented by the general formula (8) include, a fluorinated (meth)acrylate having a linear fluorinated alkyl group such as 2,2,2-trifluoroethyl (meth)acrylate (3FM), 2,2,3,3-tetrafluoropropyl (meth)acrylate (4FM), 2,2,3,3,3-pentafluoropropyl (meth)acrylate (5FM), 2,2,3,4,4,4-hexafluorobutyl (meth)acrylate (6FM), 1H,1H,5H-octafluoropentyl (meth)acrylate (8FM), 2-(perfluorobutyl)ethyl (meth)acrylate (9FM), 2-(perfluorohexyl)ethyl (meth)acrylate (13FM), 1H,1H,9H-hexadecafluorononyl (meth)acrylate (16FM), 2-(perfluorooctyl)ethyl (meth)acrylate (17FM), 1H,1H,11H-(icosafluoroundecyl) (meth)acrylate (20FM), and 2-(perfluorodecyl)ethyl (meth)acrylate (21 FM); and further include a fluorinated (meth)acrylate having a branched fluorinated alkyl group, such as hexafluoroneopentyl (meth)acrylate and hexafluoroisobutyl (meth)acrylate.

The methyl (meth)acrylate resin is, in view of the mechanical strength as a protective coating layer and preventing dissolution and diffusion of a monomer and an oligomer from the aforementioned nylon resin into a bare POF, preferably a copolymer containing a methyl (meth)acrylate unit of 70 to 95% by mass and an alkyl (meth)acrylate unit (e.g., n-butyl (meth)acrylate and ethyl (meth)acrylate) of 5 to 30% by mass.

A methyl (meth)acrylate resin, if it contains the above fluorinated alkyl (meth)acrylate unit, is, in view of the mechanical strength as a protective coating layer and preventing dissolution and diffusion of a monomer and oligomer from the aforementioned nylon resin into a bare POF, preferably a copolymer containing a methyl (meth)acrylate unit of 10 to 95% by mass and a fluorinated alkyl (meth)acrylate unit of 5 to 90% by mass; more preferably containing a methyl (meth)acrylate unit of 50 to 90% by mass and a fluorinated alkyl (meth)acrylate unit of 10 to 50% by mass; and further preferably containing a methyl (meth)acrylate unit of 60 to 90% by mass and a fluorinated alkyl (meth)acrylate unit of 10 to 40% by mass.

Examples of the copolymerization component for the methyl (meth)acrylate unit other than those mentioned above include cycloalkyl (meth)acrylates such as cyclohexyl (meth)acrylate, methylcyclohexyl (meth)acrylate, bornyl (meth)acrylate, isobornyl (meth)acrylate and adamantyl (meth)acrylate; alicyclic (meth)acrylates having other alicyclic groups such as tricyclodecanyl (meth)acrylate, (1-methyltricycloheptyl) (meth)acrylate, (1-methylhexacyclododecyl) (meth)acrylate and tricyclo[5.2.1.0$^{2,6}$]-deca-8-yl methacrylate; aromatic (meth)acrylates such as phenyl (meth)acrylate and benzyl (meth)acrylate; styrene; α-substituted styrenes such as α-methylstyrene and α-ethylstyrene; and aromatic vinyl compounds such as substituted styrene including fluorostyrene and methyl styrene.

Furthermore, a methyl (meth)acrylate resin for a protective coating layer preferably has a glass transition temperature (measured by a differential scanning calorimeter (DSC)) of 70° C. or more, more preferably 80° C. or more, and further preferably 90° C. or more. If the glass transition temperature is extremely low, an effect of preventing a monomer and/or an oligomer derived from a nylon resin of a light-shielding coating layer from migrating into a bare POF becomes insufficient. As a result, it becomes difficult to improve heat resistance of a POF cable.

Examples of the styrene resin include a styrene homopolymer and a copolymer having 80% by mass or more of a styrene unit. As the styrene homopolymer, an atactic polystyrene is preferable. The atactic polystyrene is an amorphous polymer having a glass transition temperature of about 100° C. Since it has no clear crystal melting point, a bare POF having a core formed of PMMA can be directly coated by the atactic polystyrene at a relatively low temperature (220° C. or less). On the other hand, isotactic polystyrene and syndiotactic polystyrene have a crystal melting point of 240° C. or more and thus a high coating temperature (260° C. or more) is required when a protective coating layer is formed around the periphery of a bare POF by coating. The coating temperature is preferably lower, since an influence upon a bare POF exerted by a coating process can be suppressed. A copolymerization component for a styrene unit, the monomer components exemplified as the copolymerization component for the methyl (meth)acrylate unit as mentioned above can be used.

Such a styrene resin can be selected from HF10, NF20, HT52, HF77, 679 (trade name) manufactured by PS Japan, and NIHON POLYSTY G120K, G440K, G430 (trade name) manufactured by Japan Polystyrene, Inc.

Examples of vinylidene fluoride homopolymer (hereinafter, simply referred to as PVDF) include, but not particularly limited to, KYNAR710, 720 (trade name) manufactured by Arkema K.K., HYLAR-MP10, MP20 (trade name) manufactured by Ausimont, and a KF polymer (trade name) manufactured by Kureha Corporation.

Note that a vinylidene fluoride resin is used as a protective coating layer, PVDF must be used. As a vinylidene fluoride resin commercially available, a copolymer containing a VdF unit (70 to 90% by mass), a TFE unit or HFP unit (10 to 30% by mass), and a copolymer containing a VdF unit (15 to 50% by mass), a TFE unit (30 to 70% by mass) and a HFP unit (15 to 25% by mass) are known. However, if these materials are used in a protective coating layer, a sufficient heat-resistance improving effect of a POF cable cannot be obtained.

A polybutylene terephthalate resin (hereinafter, simply referred to as a PBT resin) refers to a polymer containing, as a main constitutional unit, an oligopoly 1,4-butylene terephthalate unit represented by the following general formula (4):

[Chemical formula 2]

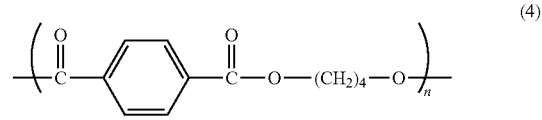

(4)

which is synthesized by polycondensation of bishydroxybutyl terephthalate (BHT) or an oligomer of BHT, which is obtained by an esterification reaction between 1,4-butanediol (tetramethylene glycol) and terephthalic acid or by a transesterification reaction between 1,4-butanediol and dimethyl terephthalate.

As a PBT resin suitable for the present invention, more specifically, an elastomer resin is preferable which contains oligopoly 1,4-butylene terephthalate represented by the above general formula (4) as a hard segment unit (crystal phase), and further contains, as a soft segment unit (amorphous phase), a block unit represented by the following general formula (5), synthesized by polycondensation between an aliphatic polyether (for example, polytetramethylene glycol (PTMG)) having a molecular weight within 200 to 5000 and at least one of terephthalic acid, dimethyl terephthalate, diethyl terephthalate, dipropyl terephthalate and dibutyl terephthalate, or a block unit of an aliphatic polyester such as poly(ε-caprolactone)(PCL) and polybutylene adipate (PBA), represented by the following general formula (6).

[Chemical formula 3]

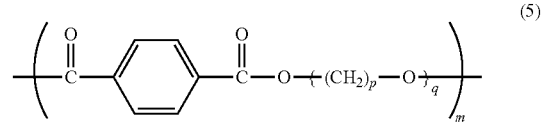

(5)

(where p represents an integer of 4 to 12 and q represents an integer of 2 to 20.)

[Chemical formula 4]

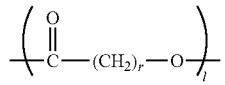

Of the above PBT resins, particularly, in view of maintaining optical performance of a POF cable and durability of pull-out strength of a coating layer under high temperature and high humidity, a PBT resin having a block unit containing an aliphatic polyether unit represented by the above general formula (5) as a soft segment unit is preferable. In particular, a PBT resin, which is a block copolymer containing a hard segment portion (A) (having the structure represented by formula (4)) composed of oligopoly 1,4-butylene terephthalate and a soft segment portion (B) (having the structure represented by formula (5) where p=4) composed of a polycondensate between terephthalic acid or a terephthalate and polytetramethylene glycol (PTMG) having a molecular weight within the range of 200 to 600 is preferable since it has excellent optical performance of a POF cable and durability of pull-out strength of a coating layer under high temperature and high humidity.

Furthermore, in the above PBT resin, the ratio (a/b) of a total mol number (a) of a 1,4-butylene terephthalate unit contained in the hard segment portion (A) relative to a total mol number (b) of a 1,4-butylene terephthalate unit contained in the soft segment portion (B) preferably falls within the range of 15/85 to 30/70. If the ratio (a/b) is extremely small, the number of ether bond units in a polymer main chain increases, with the result that the PBT resin is likely degraded by hydrolysis under high temperature and high humidity, and that the content of a soft segment increases. Consequently, the material itself is soft and likely deformed. Thus, pull-out strength decreases and an effect of preventing a monomer and an oligomer derived from a nylon resin for a light-shielding coating layer decreases. Conversely, if the ratio (a/b) is extremely large, the content of a hard segment increases, with the result that a crystal melting point increases and the coating stability of a protective coating layer decreases. In addition, the thermal adhesiveness between a bare POF and a protective coating layer and/or between a protective coating layer and a light-shielding coating layer in a coating step tends to decrease. Furthermore, as described later, when a PBT resin is used in a functional coating layer, the thermal adhesiveness between a functional coating layer (C) and a functional coating layer (D) tends to decrease. The ratio (a/b) is more preferably 18/82 or more, and further preferably 22/78 or more. On the other hand, the ratio is more preferably 27/73 or less, and further preferably 25/75 or less.

Furthermore, the crystal melting point of the above PBT resin preferably falls within the range of 155° C. or more and 205° C. or less. If the crystal melting point is extremely low, a function of preventing a monomer and an oligomer from migrating into a bare POF may become insufficient. On the other hand, if the crystal melting point is extremely high, molding stability may reduce when a protective coating layer is formed around the periphery of a bare POF by use of a co-extrusion coating apparatus (described later). The crystal melting point of a PBT resin is more preferably 195° C. or less, and further preferably 185° C. or less. The crystal melting point of a PBT resin is more preferably 165° C. or more, and further preferably 175° C. or more.

Furthermore, the above PBT resin preferably has a Shore D hardness (measured in accordance with JIS K7215 standard) within the range of 38 to 65. If the Shore D hardness is extremely low, fluidity at a high temperature tends to be high. As a result, coating stability decreases and a material itself tends to become flexible and easily deformed. Consequently, the pull-out strength between a bare POF and a light-shielding coating layer decreases. If the Shore D hardness is extremely high, in a coating step, the thermal adhesiveness between a bare POF and a protective coating layer and/or between a protective coating layer and a light-shielding coating layer decreases. As a result, the pull-out strength between the bare POF and the light-shielding coating layer decreases. The Shore D hardness is more preferably 40 or more, and further preferably 45 or more. Furthermore, the Shore D hardness is more preferably 60 or less, and further preferably 55 or less.

The crystal melting point of a PBT resin and Shore D hardness as mentioned above can be controlled by controlling the component ratio of the hard segment unit to the soft segment unit, the molecular weight of them, or the molecular weight of an entire polymer.

Such a PBT resin can be selected from, for example, Hytrel 2551, 2474, 4047, 4057, 4767 (trade name) manufactured by Du Pont-Toray Co., Ltd., DYURANEX 400LP (trade name) manufactured by Polyplastic, NUBELAN 4400 series (trade name) manufactured by Teijin Chemicals Ltd., Pelprene S type, P type (P150M) (trade name) manufactured by Toyobo Co., Ltd., and Primalloy B series (trade name) manufactured by Mitsubishi Chemical Corporation.

By using the PBT resin as mentioned above in a protective coating layer, the pull-out strength between a bare POF and a light-shielding coating layer tends to increase (for example, to 30N or more, as the case may be), which contributes to suppression of pistoning when a POF cable is placed in a high-temperature environment. When a plug is immobilized to an end of a POF cable and the cable is connected to an apparatus via the plug, a possible mechanical action such as vibration may impart an excessive force on the bare POF, which likely to break the bare POF if the adhesion between the bare POF and the light-shielding coating layer is insufficient. However, such a breakage tends to be suppressed.

Besides this, as a resin for a protective coating layer capable of expressing a strong adhesion effect, a copolymer (hereinafter, simply referred to as a "EVAL copolymer") containing an ethylene unit and a vinyl alcohol unit. The EVAL copolymer is preferably a copolymer containing an ethylene unit and a vinyl alcohol unit at a ratio of 20 to 70% by mole of the ethylene unit and 30 to 80% by mole of the vinyl alcohol unit. In particular, a copolymer having a crystal melting point within the range of 195° C. or less, and more preferably 180° C. or less and a melt-flow index (measured at 210° C., a load of 5 kgf (49N)) within the range of 25 to 80 g/10 minutes is preferable since it has not only an excellent effect of preventing a monomer and an oligomer derived from the aforementioned nylon resin from dissolving and diffusing into a bare POF but also excellent molding stability of a POF cable. Examples of the EVAL copolymer include Eval E105, G156, F104, FP104, EP105, EU105 (trade name) manufactured by Kuraray Co., Ltd.

The protective coating layer has a function of preventing a monomer and/or an oligomer derived from a nylon resin for a light-shielding coating layer from migrating into a bare POF. A POF cable having such a protective coating layer and a relatively low pull-out strength (for example, lower than 30N)

between a bare POF and a light-shielding coating layer is suitable for use in removing a part of the light-shielding coating layer from an edge portion of the POF cable and immobilizing a plug thereon.

On the other hand, among POF cables installed in cars, there is a POF cable for use in immobilizing a plug directly onto the periphery of the light-shielding coating layer of a POF cable by use of an adhesive and a laser melting method, without removing the light-shielding coating layer of an edge portion. In this case, a strong adhesion (pull-out strength) is required between the bare POF and the light-shielding coating layer. In the use required for a strong adhesion as mentioned above, a PBT resin is particularly preferable as a material for the protective coating layer.

To the protective coating layer, a light-shielding agent such as carbon black may be added similarly to the light-shielding coating layer to prevent incidence of ambient light to the bare POF. To obtain a sufficient light shielding effect without damaging a primarily purpose of the protective coating layer, e.g., 0.1% by mass or more of a light-shielding agent may be added.

[Light-Shielding Coating Layer]

Next, the light-shielding coating layer of the POF cable according to the present invention will be described.

In the POF cable according to the present invention, a light-shielding coating layer composed of a nylon resin (polyamide resin) containing a light-shielding agent such as carbon black for preventing incidence of ambient light is provided around the periphery of a bare POF having the aforementioned core-clad structure.

When a POF cable is laid in a high-temperature environment like near an engine room of a car as LAN in-car communication wiring, since oil, electrolyte and flammable substances such as gasoline are present, the cable is also required to have excellent chemical resistance simultaneously with heat resistance. For this reason, as an example of a nylon resin serving as a coating material for a POF cable, nylon 11 (homopolymer) or nylon 12 (homopolymer) having excellent heat resistance, flex resistance and chemical resistance is suitable. Nylon 11 and nylon 12 each have good moldability in a coating step and has an appropriate melting point. Therefore, the bare POF can be easily coated without reducing transmission performance of a POF cable using a PMMA resin as a core material.

The light-shielding coating layer may be formed of either one of nylon resins, i.e., nylon 11 and nylon 12. Both resins may be used as a mixture. Furthermore, another polymer or compound can be added as needed. When another component such as another polymer or compound is mixed, another component is preferably added within the range of 50% by mass or less. If the content of another component is larger than 50% by mass, the properties brought by nylon 11 and nylon 12 become insufficient. As a result, battery fluid resistance decreases, dimensional stability under heat of a POF cable tends to decrease. In the present invention, the material for a light-shielding coating layer contains a nylon resin as a major component. The content of the nylon resin component (when nylon 11 and nylon 12 are contained, the total content of them) is preferably 50% by mass or more, more preferably 70% by mass or more, and further preferably 80% by mass or more. The content of a light-shielding agent can be appropriately set as long as a desired effect of the light-shielding coating layer can be obtained, for example, can be set within the range of 0.1 to 10% by mass.

Generally, a nylon resin such as nylon 12 can be industrially obtained by a polycondensation reaction between an amine and a carboxylic acid. However, since polymerization for forming a nylon resin is an equilibrium chemical reaction, a monomer or an oligomer derived from a raw material for the nylon resin inevitably remain in the polymer produced.

According to the studies of the present inventors, in the case of a POF cable having a primary coating layer formed of nylon 11 or nylon 12 provided so as to be in contact with a bare POF, a phenomenon where transmission loss of the POF significantly increases was observed when the cable is placed in a high-temperature environment of 105° C. for a long period of time.

The present inventors have analyzed on causes of this phenomenon in detail. As a result, the inventors have ascertained that the remaining monomer or oligomer derived from the raw material is responsible for the above increase in transmission loss, that is, the remaining monomer or oligomer dissolves and diffuses into the bare POF from the primary coating layer or the secondary coating layer to cause the increase in transmission loss.

Furthermore, it has been found that significant increase in transmission loss is caused when the outermost clad layer is formed of a fluorine-containing olefin resin containing a tetrafluoroethylene (TFE) unit and having a heat of crystal fusion of a certain value or more.

Examples of the monomers derived from the aforementioned nylon resin raw material include an aliphatic diamino acid compound, an aliphatic dicarboxylic acid compound and an aminoaliphatic carboxylic acid compound, which are a monomer for forming a nylon resin, and specifically include 11-aminoundecanoic acid in the case of nylon 11 and 12-aminododecanoic acid in the case of nylon 12. Furthermore, examples of the monomers may include a by-product such as a cyclic lactam compound, which has an endocyclic amide bond (—CONH—) formed through intermolecular esterification of the molecular chain terminals of an aminocarboxylic acid compound. Specific examples of such cyclic lactam compounds include, lauryl lactam (laurolactam) in the case of nylon 12. Examples of the monomers derived from the raw material herein include a low molecular weight compound generated as a by-product in synthesizing the raw material.

On the other hand, examples of the oligomers derived from the aforementioned nylon resin raw material include a compound having both or either one of an amino group (—NH2) and a carboxyl group (—COOH) at the ends of its molecular chain, which is formed through intermolecular esterification of the molecular chain terminals of two or more molecules of the aforementioned raw-material monomers (aliphatic diamino acid compound, aliphatic dicarboxylic acid compound, amino aliphatic carboxylic acid compound, mentioned above) in the course of the polycondensation reaction for producing the nylon resin; a cyclic lactam compound having an endocyclic amide bond (—CONH—) formed through intramolecular esterification of the molecular chain terminals of the above compound; a compound formed through intermolecular esterification of the aforementioned compound; and a compound produced by a side reaction (deamination reaction or decarboxylation reaction) caused intramolecularly or intermolecularly.

In the case where a monomer or an oligomer as mentioned above is linear chain, the terminal amino group has high affinity for a fluorine-containing olefin polymer and easily remains within a clad layer formed of the fluorine-containing olefin polymer. For this reason, the transparency of the clad material reduces, and accordingly the transmission property of the resultant POF cable tends to significantly deteriorate. On the other hand, in the case where the monomer or the oligomer is a cyclic lactam compound, it migrates into the clad layer up to the inner layer side near the interface (of core or a first clad layer) and likely form particulate structures. As a result, structural irregular increases at the core-clad interface of the POF or clad-clad interface if there are two or more clad layers, and accordingly the transmission property of the POF cable tends to significantly deteriorates.

As the molecular weight of an oligomer decreases, the oligomer is likely to be dissolved and diffused in a bare POF. When the molecular weight is 2000 or less, the effect thereof is particularly significantly exerted.

As described above, a POF cable is required to be excellent in heat resistance. Particularly when a POF cable is used in a car, it is required that the amount of an increase in transmission-loss under a 105° C. environment is required to be low over a long period of time beyond 5000 hours.

In the POF cable according to the present invention, to improve the long-term heat resistance of the POF cable more higher, a light-shielding coating layer must be formed of a resin material containing at least one of nylon 11 and nylon 12 as a major component and having the total content of a monomer and an oligomer derived from the nylon resin (when only one of the monomer and the oligomer is contained, the content of the one) contained in this material within the range of 1.5% by mass or less. The total content of the monomer and the oligomer preferably falls within the range of 1.3% by mass or less, more preferably 1.0% by mass or less and particularly preferably 0.8% by mass or less. If the content of the monomer and the oligomer in the light-shielding coating layer is excessively large, particularly, larger than 1.5% by mass, the amount of the monomer and the oligomer migrating into a bare POF from the light-shielding coating layer increases, and transmission loss significantly increases. As described above, if the total content of the monomer and the oligomer in the light-shielding coating layer falls within the aforementioned range, migration of the monomer and the oligomer in the light-shielding coating layer into the bare POF is suppressed.

As the molecular weight of the oligomer decreases, the oligomer is likely to be dissolved and diffused in a bare POF. When a molecular weight is 2000 or less, the effect thereof is particularly significantly exerted. Therefore, the total content of a monomer and an oligomer which have a molecular weight of 2000 or less preferably falls within the range of 1.5% by mass or less, more preferably, 1.3% by mass or less, further preferably 1.0% by mass or less and particularly preferably 0.8% by mass or less.

As a method for reducing a monomer and an oligomer in a nylon resin, a method of controlling the temperature, moisture content during a polycondensation reaction for forming a nylon resin, and a raw material/product concentration in the reaction system; and a method of supplying a nylon resin after polymerization to an extraction tower with hot water to perform counterflow extraction with hot water; and a method of removing a monomer from molten nylon resin under a high temperature and a high vacuum, all known in the art, can be used.

A nylon resin having a total content of a monomer and an oligomer within the range of 1.3% by mass or less as mentioned above, for example, nylon 12 such as Daiamide-L1600 and L1640 (trade name) manufactured by Daicel-Evonik Ltd., and nylon 11 such as Rilsan BMF-0 (trade name) manufactured by Arkema K.K. are mentioned.

[Resin Composition (I) for Forming Functional Coating Layer (C or D)]

The plastic optical fiber cable according to the present invention has a functional coating layer (C) and a functional coating layer (D) on the outer side of a light-shielding coating layer. The functional coating layer (C) and functional coating layer (D) are formed of a resin composition (I) or a resin composition (II) (described later). When the functional coating layer (C) is formed of the resin composition (I), the functional coating layer (D) is formed of the resin composition (II). When the functional coating layer (C) is formed of the resin composition (II), the functional coating layer (D) is formed of the resin composition (I).

The resin composition (I) has a function of maintaining flexibility of a POF cable; whereas, the resin composition (II) has a function of maintaining excellent heat resistance and optical characteristics. A layer of a resin composition (I) and a layer of a resin composition (II) are laminated in combination as the functional coating layers, whereby excellent heat resistance and optical characteristics can be obtained while maintaining flexibility. As a result, the cable can be easily handled during laying and processing. Furthermore, if a flame retardant is added to the functional coating layers, high flame retardancy can be obtained. Furthermore, an inorganic colorant can be added to the functional coating layers.

The resin composition (I) is a resin composition containing a polybutylene terephthalate resin as a major component or a resin composition containing an ethylene-vinyl alcohol copolymer as a major component.

As the polybutylene terephthalate resin used in the resin composition (I), a PBT resin that can be used as a resin forming the protective coating layer as described above can be used.

Note that, when a PBT resin is used as a functional coating layer, the melting point of the PBT resin preferably falls within the range of 155° C. or more and 230° C. or less. When the melting point is extremely low, the difference in crystal melting temperature from the resin composition (II) described later becomes extremely large, with the result that molding stability in providing the functional coating layer may reduce. On the other hand, if the melting point is extremely high, when a functional coating layer is provided to the periphery of a bare POF by use of a co-extrusion coating apparatus (as described later), the optical characteristics of the POF may reduce by the effect of heat history. The melting point of a PBT resin is more preferably 220° C. or less, and further preferably 210° C. or less. Furthermore, the melting point of a PBT resin more preferably 165° C. or more, and further preferably 175° C. or more.

Furthermore, when a PBT resin is used as a functional coating layer, the PBT resin preferably has a Shore D hardness (measured in accordance with the JIS K7215 standard) within the range of 38 to 85. If Shore D hardness is extremely low, fluidity at a high temperature tends to be high and accordingly the coating stability reduces; and also the flexibility of a material itself increases and accordingly deformation may be likely to occur. If Shore D hardness is extremely high, thermal adhesiveness between the light-shielding coating layer and the functional coating layer (C) or between the functional coating layer (C) and the functional coating layer (D) reduces during the coating step. As a result, the pull-out strength between the light-shielding coating layer and the functional coating layer (C) or between the functional coating layer (C) and the functional coating layer (D) may reduce and expression of an appropriate flexibility becomes difficult. The Shore D hardness is more preferably 40 or more, and further preferably 45 or more. Furthermore, the Shore D hardness is more preferably 80 or less, and further preferably 75 or less.

The melting point and Shore D hardness of a PBT resin can be controlled by controlling the component ratio between the hard segment unit described above and the soft segment unit described above, the molecular weight of them, or the molecular weight of an entire polymer.

The PBT resin used as the functional coating layer can be selected from, for example, Hytrel 2551, 2474, 4047, 4057, 4767, 7237F (trade name) manufactured by Du Pont-Toray Co., Ltd.; DYURANEX 400LP (trade name) manufactured by Polyplastic; NUBELAN 4400 series (trade name) manufactured by Teijin Chemicals Ltd.; Pelprene S type, P type (P150M) (trade name) manufactured by Toyobo Co., Ltd.; and Primalloy B series (trade name) manufactured by Mitsubishi Chemical Corporation. Of them, Hytrel 7237F (trade name) manufactured by Du Pont-Toray Co., Ltd., is more preferably used since it has excellent flame retardancy.

The flexibility of a POF cable can be further improved by use of a PBT resin as mentioned above in the resin composition (I).

The ethylene-vinyl alcohol copolymer (hereinafter, simply referred to as an "EVAL copolymer") used in the resin composition (I) is not particularly limited; however, a copolymer containing an ethylene unit and a vinyl alcohol unit at a ratio of 20 to 70% by mole of the ethylene unit and 30 to 80% by mole of the vinyl alcohol unit. In particular, a copolymer having a crystal melting point within the range of 195° C. or less and more preferably 180° C. or less and a melt-flow index (measured at 210° C., a load of 5 kgf (49N)) within the range of 25 to 80 g/10 minutes is preferable since the molding stability of a POF cable is excellent. The crystal melting point of a copolymer is preferably 155° C. or more and more preferably 165° C. or more. If the crystal melting point is extremely low, the difference in crystal melting temperature from the resin composition (II)(described later) becomes extremely large, with the result that the molding stability when a functional coating layer is provided may reduce.

Furthermore, since an EVAL copolymer has a high oxygen barrier property, an increase in transmission loss of a bare POF under a high-temperature environment by oxidative degradation can be suppressed.

Examples of the EVAL copolymer include Eval E105, G156, F104, FP104, EP105 and EU105 (trade name) manufactured by Kuraray Co., Ltd.

The content of a polybutylene terephthalate resin or an ethylene-vinyl alcohol copolymer in the resin composition (I), to obtain desired properties, can be appropriately set to fall within the range of for example, 50% by mass or more, preferably 70% by mass or more, more preferably 80% by mass or more, and further preferably 90% by mass or more.

To the resin composition (I), an inorganic colorant can be added. The same type of colorant as used in the resin composition (II) described later can be used in the same addition amount range.

[Resin Composition (Ii) for Forming Functional Coating Layer (C or D)]

One of the features of the POF cable according to the present invention resides in that a functional coating layer formed of a resin composition (II), which is a nylon resin composition having an oxygen transmission rate within a predetermined range, is provided on the outer side of the light-shielding coating layer, thereby suppressing an increase in electrons transition absorption when a POF cable is used under a high-temperature environment. By the presence of the functional coating layer provided, it is possible to not only impart discriminability to a POF cable without diminishing heat resistance but also improve heat resistance as the case may be.

A POF cable (primary coated cable) having a light-shielding coating layer formed outside a bare POF or having a protective coating layer and a light-shielding coating layer formed outside a bare POF is stable for a long period of time even in a 105° C. environment in view of only transmission loss at a wavelength of about 650 nm. However, in the wavelength region of less than 600 nm, an increase in transmission loss of a POF is large, and thus, it was impossible to use it for signal transmission in the wavelength region of 500 to 600 nm.

On the other hand, in the POF cable used in in-car LAN, etc., to enhance discriminability and flame retardancy, a functional coating layer formed of a colored nylon resin composition is required to be formed outside the light-shielding coating layer of a primary coated cable.

Generally, since polymerization for forming a nylon resin is an equilibrium chemical reaction, a monomer and an oligomer derived from the nylon resin material inevitably remain in the resultant polymer. Furthermore, according to the results of studies of the present inventors, when a POF cable, which has a predetermined nylon resin provided as a functional coating layer outside a primary coated cable excellent in durability under a high-temperature environment of 105° C., is placed in a high-temperature environment of 105° C. for a long period of time, oxygen in the environment in which the POF cable is placed and the remaining monomer or oligomer in the functional coating layer pass through a light-shielding coating layer and a protective coating layer, permeate and diffuse into a bare POF to cause an increase in e.g., electron transition absorption and Rayleigh scattering. As a result, it was found that transmission loss of the POF increases.

Then, the present inventors intensively conducted studies on a nylon resin composition that does not diminish the heat resistance of a POF cable (primary coated cable) even if it is used in a functional coating layer. As a result, they found that an increase in transmission loss of a wavelength 600 nm or less can be significantly suppressed under a high-temperature environment of 105° C. without diminishing transmission properties at a wavelength of 650 nm, by using a nylon resin composition having a crystal melting point and oxygen transmission rate within predetermined ranges.

The resin composition (II) is a nylon resin composition having a crystal melting point as measured using differential scanning calorimetry (DSC) of 240° C. or more and 280° C. or less and having an oxygen transmission rate P ($cm^3 \cdot cm/(cm^2 \cdot sec \cdot Pa)$) at a temperature T (K) measured by a method defined in ISO14663-2:1999 (Annex C) and satisfying general formula (1) below:

$$P < 8 \times 10^{-2} \times \exp(-5600/T) \quad (1).$$

Note that the temperature T(K) at which the general formula (1) is satisfied desirably falls within the range 283K (10° C.) or more and 333K (60° C.) or less. It is known well that the oxygen transmission rate of a polymer material has the Arrhenius dependency upon temperature, and furthermore the Arrhenius dependency changes before and after a glass transition temperature. The nylon resin composition that can be used has a glass transition temperature within the range of 55 to 65° C. Therefore, the upper limit of temperature T(K) is preferably 333K (60° C.) or less; whereas, the lower limit of temperature T(K) is preferably 283K (10° C.) or more in view of measurement accuracy of oxygen transmission rate.

As such a nylon resin composition, in view of obtaining higher heat resistance improving effect, a nylon resin composition containing nylon 66 as a major component is preferable, and particularly, a nylon resin composition having oxygen transmission rate (P) satisfying any one of the conditions obtained by assigning T=296K (23° C.) to the general formula (1) and the general formulas (9) to (11) described later, is preferable.

The content of a nylon resin in a nylon resin composition can be appropriately set so as to obtain desired properties, for example, within the range of 40% by mass or more.

With respect to the nylon resin composition mentioned above (a resin composition (II) for a functional coating layer), first why the crystal melting point must fall within the range of 240° C. or more and 280° C. or less will be described.

A nylon resin is known to have a temperature called Brill transition temperature. At the Brill transition temperature, a phenomenon called Brill transition occurs, more specifically, a phenomenon where the torsional motion between a methylene group and an amide group of a polymer main chain is activated to initiate large motion involving conformational fluctuation of a methylene chain and disturbance of regularity while maintaining a hydrogen bond of the amide groups (Polymer, 44 (2003), p 6407-6417).

The Brill transition phenomenon is that occurs in a temperature region spanning about 40° C. The temperature of the peak maximum-value is called as the Brill transition temperature. It is known that the Brill transition temperature of nylon 12 (a melting point: about 180° C.) is present at about 140 to 150° C., and the Brill transition temperature of nylon 6-12 (a melting point: about 155 to 160° C.) is present at about 120 to 130° C. According to the studies of the present inventors, it was found that when a nylon resin composition containing nylon 12 or nylon 6-12 as a material for a functional coating layer of a POF cable is used, the remaining monomer or oligomer derived from the nylon resin contained in nylon 12 or nylon 6-12 migrates into the bare POF when the POF cable is placed in a 100° C. environment for a long period of time, which significantly reduces optical transmission performance. Then, the present inventors considered that since the Brill transition temperature of nylon 12 or nylon 6-12 is present at about 120 to 145° C., bleeding of the remaining monomer or oligomer is likely to occur, and hence they considered that if a nylon resin composition having a higher Brill transition temperature is used as a material for the functional coating layer, the problem can be improved.

However, the Brill transition temperature, since a specific apparatus is used for measuring it, is not an index value easily measured. Then, the present inventors investigated the possibility of using a crystal melting temperature (crystal melting point) measured by a differential scanning calorimeter (DSC) as an index value that can be measured relatively easily. As a result, it was found that the crystal melting point of a nylon resin composition used in a functional coating layer of a POF cable is set within a predetermined temperature range, whereby durability of the POF cable can be sufficiently improved. Based on the finding, the present invention was successfully attained.

To be more specific, if the crystal melting point of a nylon resin composition for a functional coating layer is lower than 240° C., when a POF cable is placed in a 105° C. environment for a long period of time, it may be impossible to suppress a phenomenon where the remaining monomer or oligomer derived from a raw material for forming a nylon resin for the functional coating layer bleeds out form the functional coating layer and migrates into a bare POF. On the other hand, if the crystal melting point is higher than 280° C., the temperature at which the functional coating layer is formed by coating must be set to be high. In particular, if the temperature is set to 300° C. or more, a bare POF having a core formed of PMMA or a copolymer containing MMA as a major component, and a light-shielding coating layer formed of a nylon resin having a relatively low melting point, such as nylon 11 and nylon 12, tend to deform with heat. As a result, the optical characteristics and heat contraction property of a POF cable is possibly diminished. The crystal melting point of a nylon resin composition for a functional coating layer is preferably 240° C. or more, more preferably 250° C. or more, and further preferably 260° C. or more. Furthermore, the crystal melting point is preferably 280° C. or less, more preferably 275° C. or less, and further preferably 270° C. or less.

A nylon resin contained in a nylon resin composition having a crystal melting point of 240° C. or more and 280° C. or less, specifically, includes a nylon 66 homopolymer, or a nylon resin composition (described later) containing nylon 66 as a major component. The expression herein that nylon 66 is contained as a major component means that nylon 66 is contained in an amount of 50% by mass or more based on the total amount (100% by mass) of the nylon resin composition, preferably 60% by mass or more and more preferably 70% by mass or more.

Nylon 66 (the maximum value of Brill temperature: about 150 to 160° C., Polymer, 42 (2001), p 10119-10132) has a melting point of 265° C., the oxygen transmission rate P at a temperature of 23° C. is about $3 \times 10^{-10}$ to $4 \times 10^{-10}$ $cm^3 \cdot cm/(cm^2 \cdot sec \cdot Pa)$ and the oxygen transmission rate P at a temperature of 105° C. is about $1 \times 10^{-8}$ to $2 \times 10^{-8}$ $cm^3 \cdot cm/(cm^2 \cdot sec \cdot Pa)$.

If the total content of a monomer and an oligomer derived from the nylon resin (when only one of the monomer and the oligomer is contained, the content of the one) contained in a resin composition (II) is in the level generally contained in a nylon resin industrially produced, the POF cable according to the present invention can acquire sufficient heat resistance. The total content of the monomer and the oligomer in the resin composition (II) preferably fall within the range of 15% by mass or less, more preferably 10% by mass or less, and particularly preferably 5.0% by mass or less. The lower limit of the total content of these compounds is not particularly limited. If the total content of the monomer and the oligomer falls within the above range, a POF cable having more sufficient heat resistance can be obtained. For example, even if the total content of the monomer and the oligomer derived from the nylon resin is 0.1% by mass or more, and further 0.5% by mass or more, if the nylon resin is used as a functional coating layer, a POF cable having sufficient heat resistance can be obtained.

Note that the monomer and the oligomer derived from a nylon resin will be more specifically described. In the case of nylon 66, the monomer refers to hexamethylenediamine and adipic acid, and the oligomer refers to a cyclic oligomer and an open-chain oligomer of a tetramer or less of a condensation compound formed of hexamethylenediamine and adipic acid. In the case of nylon 612, the monomer refers to hexamethylenediamine and decanedicarboxylic acid, and the oligomer refers to a cyclic oligomer and an open-chain oligomer of a tetramer or less of a condensation compound formed of hexamethylenediamine and decanedicarboxylic acid.

Examples of nylon 66 include UBE nylon 2015B, 2020B, 2026B (trade name) manufactured by Ube Industries, Ltd.; Amilan CM3007, CM3001-N, CM3006, CM3301, CM3304, CM3004 (trade name) manufactured by Toray Industries Inc.; Leona 1200S, 1300S, 1500, 1700 (trade name) manufactured by Asahi Kasei Chemicals Corporation; Ultramid 1000, 1003, A3, N322, A3X2G5 (trade name) manufactured by BASF; GRILON AS series, AZ series, AR, AT series (trade name) manufactured by EMS•CHEMIE AG; and Zytel 101, 103, 42A, 408 (trade name) manufactured by DuPont.

A value of transmission loss of the aforementioned POF cable is stable not only at a wavelength 650 nm but also in a short wavelength region from 500 or more and 600 nm or less and even under a high-temperature environment of 105° C. for a long period of time.

Next, oxygen transmission rate (P) of a nylon resin composition (a resin composition (II) for a functional coating layer) will be further described.

If the oxygen transmission rate (P) of a nylon resin composition is larger than the value of the right-hand side of the above formula (1), when a POF cable is placed in a high-temperature environment of 105° C. for a long period of time, oxygen in the environment in which a POF is placed passes through a light-shielding coating layer and a protective coating layer and is dissolved and diffused into the interior of a bare POF. Accordingly, tendency of oxidatively degradation of the bare POF increases. As a result, the electron transition absorption in the core portion and the clad portion of the bare POF increases, increasing transmission loss. If the oxygen transmission rate (P) satisfies the formula (1), an increase in transmission loss can be greatly suppressed.

The oxygen transmission rate (P) of a nylon resin composition preferably further satisfies the following general formula (9):

$$P < 8 \times 10^{-2} \times \exp(-5800/T) \quad (9)$$

more preferably, satisfies the following general formula (10):

$$P < 8 \times 10^{-2} \times \exp(-6000/T) \quad (10)$$

and particularly preferably, satisfies the following general formula (11):

$$P < 8 \times 10^{-2} \times \exp(-6300/T) \quad (11).$$

As a method for reducing the oxygen transmission rate of a nylon resin composition, it is preferred to use a method of controlling crystallinity within a predetermined range and a method of controlling a spherulite size within a predetermined range.

The crystallinity of a nylon resin composition as a functional coating layer preferably falls within the range of 30% or more and 55% or less. By controlling the crystallinity within the range, a nylon resin composition having a desired oxygen transmission rate can be easily obtained. If the crystallinity is extremely low, when a POF cable is treated under high temperature, post crystallization occurs. As a result, dimensional change of the POF cable occurs and a desired oxygen transmission rate cannot be obtained. Therefore, when a POF cable is placed in a 105° C. environment for a long period of time, suppression of an increase in transmission loss becomes difficult. If crystallinity is extremely large, the bending-elastic modulus of a POF cable increases, and thus handling becomes difficult. When a POF cable is wound up on a bobbin and stored for a long period of time, the cable is likely to remain curled. Problems including this are produced. The lower limit of the preferable range of the crystallinity of a nylon resin composition is more preferably 35% or more. The upper limit thereof is more preferably 50% or less, and further preferably 45% or less.

Note that crystallinity (X) is calculated from density in accordance with the following general formula:

$$\text{Crystallinity}(X) = (ds - da)/(dc - da)$$

(da: density of amorphous phase, dc: density of crystalline phase, ds: density of a sample).

In the present invention, the nylon resin composition forming a functional coating layer preferably has an average diameter of a spherocrystal under microscopic observation within the range of 0.01 µm or more and 40 µm or less.

The spherulite size herein is a value obtained by preparing ultrathin sections from a functional coating layer of a POF cable, observing the section by a microscope, taking a picture of spherulites and calculating a number average diameter of spherulites by an image analyzer.

If the spherulite size is extremely small, the mechanical strength (particularly, tensile strength) of a POF cable tends to reduce. Furthermore, if the spherulite size is extremely large, a desired oxygen transmission rate cannot be obtained. As a result, when a POF cable is placed in a 105° C. environment for a long period of time, transmission loss increases and the heat-resistant dimensional stability of the POF cable tends to be diminished. The lower limit of the preferable range of the spherulite size (average diameter) is more preferably 1.0 µm or more, and further preferably 5 µm or more. The upper limit thereof is more preferably 30 µm or less, further preferably 20 µm or less and particularly preferably 10 µm or less.

A method of controlling the crystallinity and spherulite size of nylon 66 within predetermined ranges, includes a method of controlling e.g., molding temperature and cooling rate during manufacturing time within an appropriate range. However, in the range of conditions where a POF cable can be manufactured without diminishing the performance thereof, it is difficult to control crystallinity and spherulite size to desired values. Then, in the POF cable according to the present invention, it is preferred to add a crystallizer (nucleating agent) and a predetermined flame retardant (described later) to a nylon resin composition as a resin composition (II). In this way, a spherulite size can be reduced and crystallinity can be increased.

As the crystallizer, a compound that migrates into a bare POF and has no effect upon the optical performance of a POF cable is preferable. Examples of such a crystallizer include, but not limited to, metal oxides such as magnesium oxide, aluminum oxide, zinc oxide, copper oxide and iron oxide, inorganic microparticles such as talc, silica, graphite and silicon carbide, and high-melting point polyamides such as nylon 6T and nylon 66/6T.

The content of a crystallizer in a nylon resin composition as a resin composition (II) can be appropriately set as long as the heat resistance of a POF cable at 105° C. is not diminished. The content is preferably within the range of 0.01 to 10% by mass based on the nylon resin composition (100% by mass), more preferably within the range of 0.05 to 5% by mass, and further preferably within the range of 0.3 to 3% by mass.

[Flame Retardant in Resin Composition (II)]

When flame retardancy is required for a POF cable, a flame retardant can be added to a functional coating layer.

In the present invention, the crystallinity and spherulite size of a material for the functional coating layer are controlled by adding a predetermined flame retardant (described later) to a nylon resin composition as a resin composition (II), thereby controlling the oxygen transmission rate of the functional coating layer.

In particular, since high flame retardancy is required for a POF cable to be applied to use in in-car communication, it is preferable to add a flame retardant to the functional coating layer.

When a flame retardant is added to the functional coating layer, in the POF cable according to the present invention, it is preferable not to add a flame retardant to the bare POF formed of a PMMA resin, a protective coating layer and a light-shielding coating layer. In addition, since the material of each coating layer does not have a self-extinguishing property, it is preferable to impart flame retardancy to the functional coating layer.

Generally, as the flame retardant for use in a nylon resin, a phosphorus-containing compound, a bromine-containing compound, a chlorine-containing compound, a triazine compound and a hydrated metal compound are known well and applied to various uses.

However, according to studies of the present inventors, it was found that when a POF cable is placed in a high-temperature environment of 105° C. for a long period of time, a certain type of flame retardant passes through a light-shielding coating layer and a protective coating layer and migrates into a bare POF, with the result that, a significant increase in transmission loss occurs and a coating material itself degrades. It was further found that since a considerably large content of a flame retardant is required in order to attain sufficient flame retardancy, the mechanical strength of the coating layer significantly reduces.

The present inventors investigated and researched on a flame retardant to solve such a problem. As a result, we found that using a high molecular weight type bromine-containing flame retardant alone, or using a high molecular weight type bromine-containing flame retardant in combination with an antimony oxide in an amount within a predetermined range relative to a nylon resin is suitable for the POF cable according to the present invention.

To describe more specifically, provided that the total of a nylon resin composition as a resin composition (II) is 100% by mass, a bromine-containing flame retardant is preferably added in such an amount that the content of a bromine atom in the resin composition falls within the range of 1.5 to 30% by mass. Furthermore, provided that the total of a nylon resin composition is 100% by mass, an antimony oxide is preferably added in an amount within the range of 0.1 to 20% by mass. If the content of a bromine atom is less than 1.5% by mass, it tends to be difficult to impart sufficient flame retardancy to a POF cable. If the content thereof is larger than 30% by mass, the abrasion resistance and mechanical strength of a POF cable decrease, or the bending-elastic modulus of the POF cable becomes extremely high, with the result that handling becomes difficult. The content of a bromine atom is more preferably 5% by mass or more, further preferably 8% by mass or more and particularly preferably 10% by mass or more. Furthermore, the content of a bromine atom is more preferably 25% by mass or less, further preferably 20% by mass or less and particularly preferably 15% by mass or less.

Of the bromine-containing flame retardants mentioned above, at least one selected from bromine-substituted polystyrene and poly(brominated benzylacrylate) is preferable and at least one selected from brominated polystyrene, polydibromostyrene and poly(pentabromobenzylacrylate) is particularly preferable. The number average molecular weight of these bromine-containing flame retardants preferably falls within the range of 900 or more and 60,000 or less. The number average molecular weight (Mn) herein refers to a polystyrene equivalent molecular weight measured by gel permeation chromatography (GPC).

The molecular weight of the bromine-containing flame retardant is less than 900, when a POF cable is placed in a high-temperature environment of 105° C. for a long period of time, a bromine-containing flame retardant tends to bleed out from a functional coating layer, passes through a light-shielding coating layer and a protective coating layer and migrates into a bare POF, significantly increasing transmission loss. Alternatively, the bromine-containing flame retardant breeds out to the surface of the POF cable, with the result that the flame retardancy of the POF cable may diminish.

If the molecular weight of the bromine-containing flame retardant is larger than 60,000, the fluidity of the bromine-containing flame retardant, and solubility and dispersibility thereof in a nylon resin composition decreases. As a result, the flame retardancy and mechanical strength of a POF cable decrease and appearance of the cable tends to be damaged.

Examples of the brominated polystyrene (BrPS) or polydibromostyrene (PDBS) include a compound represented by the following general formula (12) and having a number average molecular weight of 900 to 60,000.

[Chemical formula 5]

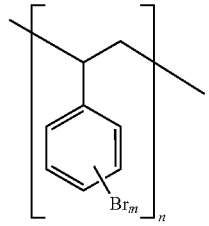

(12)

where m=2 in the case of polydibromostyrene; m=2 to 5 in the case of brominated polystyrene; and n represents a natural number.

Examples thereof include FR-803P (trade name) manufactured by Bromochem; SAYTEX-HP-7010, HP-3010, PYRO-CHEK-68PB (trade name) manufactured by Albemarle Corporation; PB-411, PBDS-80, PBS-64HW, CP-411 (trade name) manufactured by GLC; and Plasafety-1200 (trade name) manufactured by MANAC Incorporated.

Even if a bromine-containing flame retardant may be used alone, a flame retardancy improving effect can be obtained; however if it is used in combination with an antimony oxide, flame retardancy can be further increased. Since an antimony oxide does not migrate into a bare POF even if a POF cable is placed in a high-temperature environment for a long period of time, it is suitable for the POF cable according to the present invention. Examples of such an antimony oxide include antimony trioxide and antimony pentoxide, and antimony pentoxide is preferable in view of low cost. The content of an antimony oxide is as follows. Provided that the total of the nylon resin composition as a resin composition (II) is 100% by mass, and to a bromine-containing flame retardant added such that a bromine atom content falls within the range of 1.5 to 30% by mass, an antimony oxide preferably added in an amount within the range of 0.1 to 20% by mass.

If the content of an antimony oxide exceeds 20% by mass, the abrasion resistance and mechanical strength of a POF cable decreases, or bending-elastic modulus of the POF cable becomes extremely high, with the result that handling may become difficult. The content of an antimony oxide is more preferably 15% by mass or less, and further preferably 10% by mass or less. Furthermore, when a bromine-containing flame retardant is used in combination with an antimony oxide, the mass ratio of the bromine-containing flame retardant to the antimony oxide (bromine-containing flame retardant/an antimony oxide) is preferably set so as to fall within the range of 1/1 or more and 4/1 or less. If the mass ratio is excessively high, a synergetic effect on flame retardancy brought by the addition of an antimony oxide is not sufficiently exerted. If the mass ratio is extremely low, which means that an antimony oxide is excessively added, a significant increase in flame retardancy is not obtained, while the abrasion resistance and mechanical strength of a POF cable decrease, or the bending-elastic modulus of the POF cable may increase. The mass ratio of bromine-containing flame retardant to an antimony oxide is more preferably 1.5/1 or more, and further preferably 2/1 or more. Furthermore, the mass ratio is more preferably 3/1 or less, and further preferably 2.5/1 or less.

Examples of antimony trioxide include PATOX series (CZ, etc.) and STOX series (trade name) manufactured by Nihon Seiko Co., Ltd.; and FCP AT-3, AT-3CN (trade name) manufactured by Suzuhiro Chemical Co., Ltd. Examples of antimony pentoxide include Sun Epoch (trade name) manufactured by Nissan Chemical Industries, Ltd.

[Colorant in Resin Composition (II)]

In a POF cable according to the present invention, to a nylon resin composition as a resin composition (II), a specific colorant can be added, or the aforementioned flame retardant can be added in combination with a specific colorant. In this manner, the crystallinity of the material for a functional coating layer is increased and the spherulite size is reduced, thereby controlling oxygen transmission rate. In this way, when the POF cable is used under a high-temperature environment, the transmission property thereof can be stably maintained.

As general colorants for thermoplastic resins, organic pigments and inorganic pigments are widely used. In a POF cable according to the present invention, as a colorant for identification, a chromatic inorganic pigment is used.

According to studies of the present inventors, it was found that when a POF cable having a functional coating layer to which an organic pigment is added is placed in a high-temperature environment of 105° C. for a long period of time, the organic pigment passes through a light-shielding coating layer and a protective coating layer, migrates into a bare POF and significantly increases transmission loss. On the other hand, we clarified that when an inorganic pigment is used, such a migration phenomenon is not observed and even if the POF cable is placed in a high-temperature environment of 105° C. for a long period of time, the pigment does not exert an influence upon transmission loss.

The content of an inorganic pigment, provided that the total of a nylon resin composition is 100% by mass, preferably fall within the range of 0.1% by mass or more and 10% by mass or less. If the content of an inorganic pigment is less than 0.1% by mass, the coloring effect is insufficient and it tends to be difficult to have bright shade of color. If the content of an inorganic pigment exceeds 10% by mass, the mechanical strength of a coating material decreases and thereby abrasion resistance and scratch resistance may decrease. The content of an inorganic pigment is preferably 0.5% by mass or more, further preferably 1% by mass or more and particularly preferably 3% by mass or more. Furthermore, the content of an inorganic pigment is more preferably 7% by mass or less, and further preferably 5% by mass or less.

Examples of an inorganic pigment include a rare metal-based compound containing at least one of cerium or lanthanum if green is required, ultramarine blue and iron blue when blue is required, yellow iron oxide when yellow is required, red iron oxide (ferric oxide) when red is required, titanium oxide, talc and kaolin when white is required, and carbon black and black iron oxide when black is required. Of them, at least one of colorant selected from ultramarine blue, iron blue, iron oxide, red iron oxide, titanium oxide, rare metal-based compound and carbon black is suitably used.

Next, embodiments of a POF cable having the aforementioned elements will be described.

A POF cable according to an embodiment of the present invention has the aforementioned basic structure (bare POF (core-clad), light-shielding coating layer, functional coating layer (C), functional coating layer (D)). If the functional coating layer (C) is formed of a resin composition (I), the functional coating layer (D) is formed of a resin composition (II) (first embodiment). If the functional coating layer (C) is formed of the resin composition (II), the functional coating layer (D) is formed of the resin composition (I) (second embodiment). The first and second embodiments each have a relationship between the thickness of the functional coating layer (C) and the thickness of the functional coating layer (D) set within a specific range. Since the functional coating layer (C) and the functional coating layer (D) are provided, an increase in transmission loss can be suppressed under a high-temperature environment, and excellent flexibility can be ensured. The POF cable according to the embodiments preferably has a protective coating layer between the bare POF and the light-shielding coating layer.

In the POF cable according to the embodiments, after treated with heat at 125° C. for 500 hours, the total content of a monomer and an oligomer derived from the nylon resin (when only one of the monomer and the oligomer is contained, the content of the one. Hereinafter, appropriately referred to as a "monomer and/or oligomer content") contained in a bare POF is preferably 30 ppm or less.

A monomer and/or an oligomer derived from a nylon resin migrate into a bare POF when a POF cable is exposed in a high-temperature environment, which causes heat deterioration and may be a cause of coloration. If a migration amount (monomer and/or oligomer content) is larger than 30 ppm, coloration due to deterioration exerts an influence upon the optical characteristics of a POF. As a result, transmission loss on a short wavelength side becomes worse. Although it is very difficult to completely prevent a monomer and/or an oligomer derived from a nylon resin from migrating into a bare POF, an increase in transmission loss can be suppressed by reducing the migration amount to 30 ppm or less, thereby obtaining a preferable material for transmitting a signal. The smaller the migration amount, the more preferable it is. The migration amount is more preferably 25 ppm or less.

The content of a monomer and/or an oligomer derived from a nylon resin in a bare POF can be measured by a wide variety of known measurement methods such as high performance liquid chromatography (HPLC), nuclear magnetic resonance (NMR) and gas chromatography (GC). Of these, gas chromatography (GC/FID) equipped with a flame ionization detector is preferable since detection sensitivity is high. In the present invention, a sample is prepared by adding a predetermined amount of internal standard sample to a solution in which a bare POF is dissolved, and subjected to measurement by gas chromatography equipped with a flame ionization detector, and then the peak area derived from the internal standard sample is compared to the peak area derived from a monomer and/or an oligomer to obtain a content of the monomer and/or the oligomer.

Now, the thickness of each of a protective coating layer, a light-shielding coating layer, a functional coating layer (C) and a functional coating layer (D), the relationship between these thicknesses, the relationship of each of the thicknesses of the functional coating layer (C) and the functional coating layer (D) relative to the total thickness of all functional coating layers (functional coating layer (C)+functional coating layer (D)) will be described.

In the present invention, provided that the outer diameter of a bare POF having a core-clad structure is represented by A ($\mu$m), the thickness of the protective coating layer is represented by a ($\mu$m), the thickness of the light-shielding coating layer is represented by b ($\mu$m), the thickness of the functional coating layer (C) is represented by c ($\mu$m), and the thickness of the functional coating layer (D) is represented by d (μm), in view of obtaining mechanical characteristics and heat resistance in a balanced manner, the values of A, a, b, c and d are preferably set in the ranges satisfying the following formulae.

When the protective coating layer is not provided, the following formulas are preferably satisfied.

$$900 \leq A \leq 1100$$

$$200 \leq b \leq 350$$

$$500 \leq b+c+d \leq 660$$

If the thickness b of the light-shielding coating layer is smaller than 200 μm, the chemical resistance of a POF cable decreases. If the thickness is larger than 350 μm, the remaining monomer or oligomer derived from the light-shielding coating layer may exert an influence upon the optical characteristics of the bare POF. If the thickness (b+c+d) of the entire coating layer is smaller than 500 μm, the effect of each layer such as effects of protecting the bare POF from vibration within a car and from a high temperature and high humid environment may become insufficient. Conversely, if the thickness of the entire coating layer is larger than 660 μm, the bending elasticity of a POF cable increases and handling of the cable during processing becomes difficult.

When a protective coating layer is provided, the following formulas are preferably satisfied.

$$900 \leq A \leq 1100$$

$$1.5 \leq b/a \leq 30$$

$$5.5 \leq (b+c+d)/a \leq 70$$

If b/a is smaller than 1.5, the pull-out strength between the bare POF and the light-shielding coating layer, the mechanical characteristics of a POF cable, battery-fluid resistance required for automotive application, or pistoning may decrease. If b/a is larger than 30, the thickness of the protective coating layer reduces, and accordingly migration of the remaining monomer or oligomer derived from a nylon resin contained in the light-shielding coating layer and the resin composition (II) may not be blocked by the protective coating layer. More preferable range is $2.0 \leq b/a \leq 10$, and the further preferable range is $3.0 \leq b/a \leq 5.0$.

The thickness (c+d) of functional coating layers (C) and (D), the thickness b of the light-shielding coating layer, and the thickness a of the protective coating layer preferably satisfy the relationship:

$$5.5 \leq (b+c+d)/a \leq 70.$$

If (b+c+d)/a is smaller than 5.5, the pull-out strength between the bare POF and the light-shielding coating layer, the mechanical characteristics of a POF cable, battery fluid resistance required for automotive application, or pistoning may decrease. If (b+c+d)/a is larger than 70, the thickness of the protective coating layer reduces, and accordingly migration of the remaining monomer or oligomer derived from a nylon resin contained in the light-shielding coating layer and the resin composition (II) may not be blocked by the protective coating layer. More preferable range is $8.0 \leq (b+c+d)/a \leq 40$, and the further preferable range is $9.5 \leq (b+c+d)/a \leq 10$.

Furthermore, provided that the outer diameter of the bare POF is 900 to 1100 μm, the thickness a (μm) of the protective coating layer, the thickness b (μm) of the light-shielding coating layer, the thickness c (μm) of the functional coating layer (C) and the thickness d (μm) of the functional coating layer (D) are not particularly limited; however, they are preferably satisfy the following relationships.

$$10 \leq a \leq 100$$

$$140 \leq b \leq 300$$

$$200 \leq a+b \leq 350$$

$$500 \leq a+b+c+d \leq 660.$$

If the thickness a of the protective coating layer is smaller than 10 μm, the effect of blocking the remaining monomer or oligomer tends to be insufficient. Conversely, if the thickness a is larger than 100 μm, the pull-out strength between the bare POF and the light-shielding coating layer tends to decreases, and pistoning tends to increase.

If the thickness b of the light-shielding coating layer is smaller than 140 μm, the chemical resistance of a POF cable may decrease. Conversely, if the thickness is larger than 300 μm, the blocking effect of the remaining monomer or oligomer derived from the light-shielding coating layer may become insufficient.

If the total thickness (a+b) of the protective coating layer and the light-shielding coating layer is smaller than 200 μm, since the thickness of a layer formed of nylon 11 or nylon 12 is small, the solvent resistance of a POF cable may decrease. Conversely, if the total thickness is larger than 350 μm, when the protective coating layer and the light-shielding coating layer are simultaneously applied to the periphery of the bare POF by a single crosshead (as described later), the bare POF is likely to deteriorate with heat.

If the total thickness (a+b+c+d) of the coating layers is smaller than 500 μm, the effect of each layer such as the effect of protecting the bare POF from vibration within a car and from a high temperature and high humidity environment may become insufficient. Conversely, if the total thickness is larger than 660 μm, the bending elasticity of a POF cable increases and handling of the cable during processing becomes difficult.

In any case where the protective coating layer is provided and not provided, the thickness c (μm) of the functional coating layer (C) and the thickness d (μm) of the functional coating layer (D) preferably satisfy the following formula (2) or (3).

In the case (first embodiment) where the functional coating layer (C) is formed of the resin composition (I) and the functional coating layer (D) is formed of the resin composition (II), the following formula (2) is preferably satisfied.

$$0.39 \leq c/(c+d) \leq 0.9 \tag{2}$$

In this case, if the ratio of the thickness c of the functional coating layer (C) relative to the total thickness (c+d) of the functional coating layer (C) and the functional coating layer (D) is larger than 0.9, the flexibility of the cable improves; however, the oxidative degradation suppression function provided by the functional coating layer (D) is not sufficiently exerted and transmission loss may increase under a high-temperature environment. Conversely, if the ratio of the thickness c of the functional coating layer (C) is smaller than 0.39, the bending-elastic modulus of a POF cable increases and handling of the cable during processing may become difficult.

Furthermore, if the ratio of the thickness c of the functional coating layer (C) is smaller than 0.39, when the coating layer is burned, the resin composition (I) present inside may be melted earlier than the resin composition (II) because of the difference in melting point between the resin composition (I) and the resin composition (II), and fall in the form of liquid drops, which is called dropping. When dropping occurs, a region storing air is produced inside the functional coating layer (D) formed of the resin composition (II) and thus flame retardancy of a POF cable decreases.

In view of the above aspects, the upper limit value in formula (2) is preferably 0.8 or less and more preferably 0.75 or less. Furthermore, the lower limit value in the formula (2) is preferably 0.40 or more and more preferably 0.41 or more.

On the other hand, the case (second embodiment) where the functional coating layer (C) is formed of the resin composition (II) and the functional coating layer (D) is formed of the resin composition (I) preferably satisfies the following formula (3):

$$0.15 \leq c/(c+d) \leq 0.7 \tag{3}.$$

In this case, if the ratio of the thickness c of the functional coating layer (C) relative to the total thickness (c+d) of the functional coating layer (C) and the functional coating layer (D) is larger than 0.7, heat resistance becomes high; however, the bending-elastic modulus of a POF cable increases, and handling of the cable during processing may become difficult. Conversely, if the ratio of the thickness c of the functional coating layer (C) is smaller than 0.15, the bending-elastic modulus of a POF cable decreases, with the result that a more flexible cable to be easily handled can be obtained; however, an oxidative degradation suppression effect is not sufficiently exerted, and an increase in transmission loss may occur under a high-temperature environment.

In view of the aspects mentioned above, the upper limit value in formula (3) is preferably 0.65 or less and more preferably 0.6 or less. Furthermore, the lower limit value is preferably 0.20 or more.

Next, a method of producing the POF cable according to the present invention will be described.

A bare POF is produced, for example, by a composite spinning method.

Coating of a bare POF can be performed by use of an extrusion coating apparatus equipped with a crosshead die so as to coat the periphery of the bare POF with a coating material.

The range of the coating temperature T1 at which a bare POF is coated is preferably from 190° C. or more and 230° C. or less when a protective coating layer and a light-shielding coating layer are formed. If the coating temperature is less than 190° C., a coating resin does not sufficiently melt and forms a lump. As a result, the resultant coating film has a large variation in thickness. Also, the coating resin does not smoothly flow through a pipe of the coating apparatus, and a sufficient amount of resin is not discharged, which make it difficult to desirably control the thickness. If the coating temperature is higher than 230° C., a bare POF is likely to soften, and the outer diameter thereof may be varied by the pressure of the coating resin to be supplied in a coating step, and also transmission loss may increase by heat deterioration. To control the thickness of a coating layer to be thin and uniform, and to maintain the optical characteristics of a bare POF, the coating temperature T more preferably falls within the range of 200° C. to 220° C.

The coating temperature T2 of a functional coating layer (C) and a functional coating layer (D) varies depending upon the main material for a resin composition. However, providing that the melting point of a functional coating material is expressed by M° C., the coating temperature T2 is preferably M+3° C. or more and M+15° C. or less. If the coating temperature is lower than M+3° C., a coating material does not sufficiently melt and forms a lump. As a result, the resultant coating film has a large variation in thickness. Also, the coating material does not smoothly flow through a pipe of the coating apparatus, and a sufficient amount of coating material is not discharged, which make it difficult to desirably control the thickness. If the coating temperature is higher than M+15° C., a bare POF or a primary coating layer (protective coating layer, light-shielding coating layer) likely to soften, and the outer diameter thereof may be varied by the pressure of the coating material to be supplied in a coating step, and also transmission loss may increase by heat deterioration. To control the thickness of a coating layer to be thin and uniform, and to maintain the optical characteristics of a bare POF, the coating temperature T2 more preferably falls within the range of M+5° C. or more and M+10° C. or less. When two layers, i.e., the functional coating layer (C) and a functional coating layer (D) are coated simultaneously, the temperatures of a crosshead portion and a dice nipple portion are preferably set in accordance with a set temperature of the functional coating layer (D).

Figure 2:
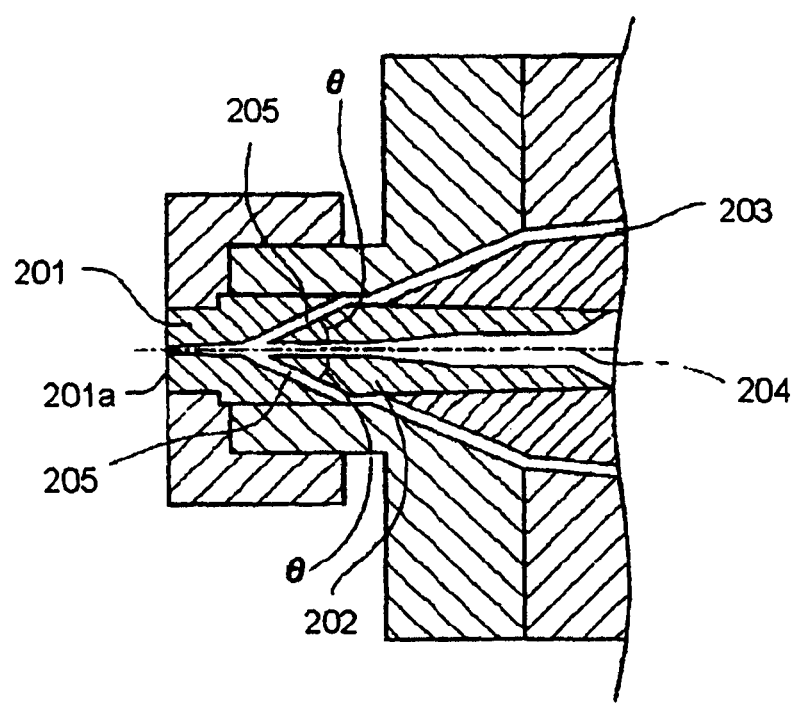
FIG. 2 is a sectional view of an example of a coating apparatus used in manufacturing a plastic optical fiber cable.

As the coating apparatus, an apparatus (crosshead die) having a crosshead as shown in FIG. 2 is preferably used. The bare POF passes through a channel along an axis line 204 provided in a dice 201 and a nipple 202 of the crosshead, and is coated. Thereafter, the bare POF is pushed as a POF cable out of the opening of a forefront surface 201a of the dice 201. At this time, in the crosshead, a coating material from a coating material channel 203 is applied to the periphery of the bare POF. When the light-shielding coating layer is formed, the POF having the protective coating layer formed thereon is passed through the channel. When the functional coating layer (C) is formed, the POF having the light-shielding coating layer further formed thereon is passed through the channel. When the functional coating layer (D) is formed, the POF having the functional coating layer (C) further formed thereon is passed through the channel.

In the dice-nipple portion, the angle θ (taper angle of dice-nipple) defined between a coating-material channel 205 and the axis line 204 is preferably 20° to 70°. More specifically, the bare POF (or POF having a coating layer formed thereon) and the coating material are preferably in contact with each other at an angle defined between the center axis of the bare POF and the flow direction of the coating-material channel 205 within the range of 20° to 70°. If the angle θ is less than 20°, it is difficult to form a coating layer having a uniform thickness on the bare POF. On the other hand, if the angle θ exceeds 70°, heat and stress provided by the coating material heated to a high temperature to the bare POF increase. In some cases, the optical characteristics of the bare POF degrade. When the light-shielding coating layer and the protective coating layer are formed, they are preferably formed so as to have an angle θ of 30° to 45°. When the functional coating layer (C) and the functional coating layer (D) are formed, they are preferably formed so as to have an angle θ of 30° to 60°.

When the resin composition (I), particularly a resin composition containing a PBT resin as a major component, is used as the functional coating layer (C), the light-shielding coating layer and the functional coating layer (C) do not sufficiently adhere. Therefore, it is preferable to increase adhesion strength between the light-shielding coating layer and the functional coating layer (C) by reducing the pressure of the resin channel in the crosshead.

Next, a method of transmitting a signal by use of the POF cable according to the present invention will be described.

As described above, a visible light LED having an emission center wavelength of about 650 nm has been widely used as a light source of a POF; however it has a problem of insufficient heat resistance at 100° C. or more. This is because such an LED, which is formed of GaAlAs-based material, has a large content of an Al component and thus the LED is likely oxidized.

In contrast, as a visible light LED having an emission center wavelength of 600 nm or less, for example, InGaN-based (emission center wavelength: 505 nm, 520 nm) and PGaN-based (emission center wavelength: 565 nm) and InGaAlP-based (emission center wavelength: 590 nm) LEDs are known, which do not contain an Al component reducing heat resistance thereof, alternatively, even if it contains an Al component but low. Accordingly, the heat resistance of the LED itself at 100° C. or more reaches the level which can be sufficiently used in practice.

On the other hand, as mentioned above, the POF cable according to the present invention has the protective coating layer, the light-shielding coating layer, the functional coating layer (C) and the functional coating layer (D), which are formed of specific materials and provided around the periphery of the bare POF, and increase in transmission loss of the POF is significantly suppressed under a high-temperature environment of 100° C. or more and even in the wavelength region of a 600 nm or less.

By using the POF cable according to the present invention and a visible light LED having a emission center wavelength in a range of 500 nm or more and 600 nm or less in combination, signal transmission can be satisfactorily performed in the field requiring long-term heat resistance at 100° C. or more, such as an in-car signal transmission field.

As the visible light LED mentioned above, an LED selected from an InGaN-based LED having an emission center wavelength of around 520 nm, a PGaN-based LED having an emission center wavelength of around 565 nm and an AlGaInP-based LED having an emission center wavelength of around 590 nm can be used, but is not particularly limited.

EXAMPLES

The present invention will be described by way of Examples, below.

Individual Examples according to the present invention were evaluated in accordance with the evaluation methods described below. The structure of a POF cable and evaluation results of each of Examples are shown in Tables together with those of Comparative Examples.

[Measurement of Heat of Crystal Fusion (ΔH) and Crystal Melting Point (Tm)]

Measurement was made by using a differential scanning calorimeter (DSC)(trade name: DSC-220 manufactured by Seiko Instruments Inc.). A sample was raised in temperature at a temperature raising rate of 10° C./minute to 200° C. and maintained for 5 minutes to melt, and then, cooled at a rate of 10° C./minute to 0° C., and again raised at a temperature raising rate of 10° C./minute and maintained for 5 minutes, and then cooled at a rate of 10° C./minute. At this time point, a heat of crystal fusion (ΔH) was obtained. Furthermore, a maximum point of a crystal fusion peak was defined as a crystal melting point.

[Measurement of Refractive Index]

Film-form test pieces of 200 μm in thickness were formed by a melting press and the refractive index ($_nD_{23}$) of a sodium D line was measured by Abbe refractometer at room temperature (23° C.).

[Quantitative Analysis and Qualitative Analysis of Low Molecular Weight Compound (Monomer and Oligomer) in Nylon Resin]

Nylon resin pellets (50 g) and methanol (100 ml) were placed in a 300-ml eggplant flask and refluxed for 24 hours while stirring. After the reflux, methanol was transferred to a beaker. Fresh methanol was supplied in the eggplant flask and refluxed for further 24 hours. After the reflux, a methanol solution extracted (200 ml in total) was dried. The mass (X g) of the resultant dried substance was measured.

The dried substance was subjected to qualitative analysis by using a mass spectrometer (MS)(trade name: SX-102 manufactured by JEOL Ltd.) and thermal desorption GC-MS (trade name: HP5890/5972 manufactured by Agilent).

Furthermore, an appropriate amount of the dried substance was again dissolved in methanol and subjected to preparative size exclusion chromatography (SEC)(trade name: LC-10, manufactured by Japan Analytical Industry Co., Ltd.). The dried substance was fractionated by molecular weight and collected. Furthermore, the collected substance was subjected to qualitative analysis performed by nuclear magnetic resonance spectrum measurement (NMR)(trade name: EX-270 manufactured by JEOL Ltd.).

Note that the content of the low molecular weight compound (total content of a monomer and an oligomer) contained in the nylon resin pellet was obtained by calculation in accordance with the following formula (IX):

$$[\text{Content}] = X/50 \times 100 (\% \text{ by mass}) \tag{IX}$$

[Measurement of Crystallinity (X)]

In a constant-temperature water bath controlled at 25° C., a density gradient tube containing n-heptane and carbon tetrachloride was prepared, a sample of about 5 mm×5 mm in size was prepared and placed. After 24 hours, values were read. Density (ds) was determined based on the values thus read. Subsequently, using density (ds), crystallinity (X) was obtained by calculation in accordance with the following general formula:

$$\text{Crystallinity}(X) = (ds-da)/(dc-da)$$

where da: density of amorphous phase, dc: density of crystalline phase, and ds: density of a sample.

Values of da and dc were obtained from X-ray diffraction and an infrared spectrum. In the case of nylon 66, da=1.09 and dc=1.24 were used.

[Measurement of Spherulite Size]

From a functional coating layer of a POF cable, ultra-thin sections were cut out by a microtome. The sections were observed by a polarizing microscope. After pictures of spherulites were taken, diameters of 20 spherulites were measured by an image analyzer and a number average thereof was computationally obtained. This was determined as the size of a spherulite size.

[Heat Resistance Test Method]

Using light having a wavelength of 650 nm and launch NA=0.1, the transmission loss of a POF cable in the beginning and transmission loss of the POF cable after placed in an oven of 105° C. for 5000 hours were measured by a 25-1 m cutback method.

[Measurement of Oxygen Transmission Rate]

In accordance with the method defined in ISO14663-2: 1999 (Annex C), the oxygen transmission rate of a coating material was measured as follows.

A nylon resin composition for forming a functional coating layer was molded by a compression molding machine under heating to prepare film-form test pieces having a thickness of 100 μm. Using an oxygen transmission rate measuring apparatus (name of machine: OXTRAN (registered trade mark)) manufactured by MOCON, U.S., oxygen transmission rate [$cm^3 \cdot cm/(cm^2 \cdot sec \cdot Pa)$] was measured at a temperature of 23° C. in a humidity of 0% RH.

[Flame Retardancy Test]

A flame retardancy test was performed based on a measurement method in accordance with DIN72551-5.

Note that the measurement method is a method prepared by modifying DIN72551-5 that defines a flame retardancy measurement method for electric wires, as follows, to measure the flame retardancy of a POF cable.

More specifically, in the original measurement method, an electric wire during and after burning must be kept at an oblique angle of 45°. However, unlike the electric wire, when a POF cable was burned, it is difficult to keep it at such an oblique angle of 45°. Therefore, to keep the POF cable during and after burning at an oblique angle of 45°, a pair of copper wires are wound spirally around the POF cable so as to mutually cross. In this state, flame retardancy is measured. The copper wire used herein has a diameter of 0.7 mmϕ, and the spiral pitch is 20 mm in the longitudinal direction of the optical fiber cable.

The acceptance/rejection criteria of the flame retardancy test are as follows. Flame of a burner is applied to a POF cable for 7 seconds to ignite it and then the flame is taken away from the sample. If the sample whose flame goes out within 30 seconds is regarded as acceptable and the sample whose flame does not goes out within 30 seconds is regarded as unacceptable. This test was carried out with respect to 10 samples. If 8 or more samples were determined as acceptable, the flame retardancy was evaluated as "○", and if less than 8 samples were determined as acceptable, the flame retardancy was evaluated as "x". In addition, the number of samples whose flame went out within 30 seconds was recorded.

[Measurement of Bending-Elastic Modulus of POF Cable]

A POF cable was immobilized by two anchorage points and pressed by a cable bending tool perpendicularly to the center axis of the cable. The interval between the anchorage points was set to 15 mm. When pressed, the POF cable turns into a circular arch having a curvature radius of 5 mm. The stress (N) applied to the cable bending tool when the cable bending tool was displaced by 1 mm from the initiation point of pressing, was measured and regarded as a bending-elastic modulus (N/mm). Based on the result, the bending-elastic modulus of the POF cable was evaluated as follows.

○: bending-elastic modulus is 10 N or more and 18 N or less, x: bending-elastic modulus is 6 N or more and less than 10 N, or beyond 18 N.

If a bending-elastic modulus is extremely low, the POF cable becomes soft and easily twisted in handling. Conversely, if a bending-elastic modulus is extremely high, the POF cable becomes stiff and handling becomes difficult. When a POF cable is wound up on a bobbin and stored, the cable is likely to remain "curled".

[Quantification of Monomer and/or Oligomer Derived from a Nylon Resin Migrating from Light-Shielding Coating Layer into Bare POF]

When the nylon resin contained in a resin composition forming the light-shielding coating layer is nylon 12, how to measure the amount of low molecular weight compound (monomer and/or oligomer) derived from nylon 12 will be described. In this Example, as a low molecular weight compound migrating from a light-shielding coating layer to a bare POF, a raw material of nylon 12, i.e., lauryl lactam, was detected.

The amount of lauryl lactam contained in a bare POF was quantified in the following manner.

Quantification was performed by using gas chromatography HP-6890 manufactured by Agilent Technologies in the following conditions.

Separation column: DB-5 (0.32 mm in diameter, 30 m long, 0.25 μm thick) manufactured by J & W SCIENTIFIC, Injection amount: 1 μl, Carrier gas: He (1.3 ml/min, linear velocity 41 cm/sec), Injection-port temperature: 270° C., Detector temperature: 250° C., Column-measurement temperature program: maintained at 100° C. for 5 minutes, raised at a temperature raising rate of 10° C./min to 200° C., maintained at 200° C. for 1 minute, raised at a temperature raising rate of 20° C./min to 300° C.

Next, a method for forming a calibration curve will be described.

First, the following sample solutions were prepared.

Preparation of Internal Standard Solution (ϵ-Caprolactam Dilute Solution)

ϵ-Caprolactam (10 mg) was diluted with acetone to obtain a total amount of 50 ml.

Preparation of Calibration Curve Solutions 1 to 3

Calibration curve solution 1: Lauryl lactam (10 mg) was diluted with acetone to obtain a total amount of 50 ml. Further, 1 ml of the solution was taken and diluted with acetone (2 ml). To this, 1 ml of the ϵ-caprolactam dilute solution (described above) serving as an internal standard substance was added.

Calibration curve solution 2: Lauryl lactam (10 mg) was diluted with acetone to obtain a total amount of 50 ml. Further, 2 ml of the solution was taken and diluted with acetone (1 ml). To this, 1 ml of the ϵ-caprolactam dilute solution (described above) serving as an internal standard substance was added.

Calibration curve solution 3: Lauryl lactam (10 mg) was diluted with acetone to obtain a total amount of 50 ml. Further, to 3 ml of the solution, 1 ml of the ϵ-caprolactam dilute solution (described above) serving as an internal standard substance was added.

Next, a calibration curve was prepared in the following manner.

Calibration curve solutions 1 to 3 prepared above were subjected to the measurement by gas chromatography (GC/FID) with a flame ionization detector in the above conditions. The relational expression between a peak area ratio (a value, which was obtained by dividing the peak area of lauryl lactam (retention time: 14 minutes) by the peak area of the internal standard (retention time: 6.4 minutes)), and the lauryl lactam content in the calibration curve solution was obtained.

Next, how to measure the amount of lauryl lactam contained in a bare POF of Examples and Comparative Examples will be described.

First, the following sample solution was prepared.

First, a POF cable was subjected to a heat treatment performed at 125° C. for 500 hours under an ambient atmosphere. After the heat treatment, a protective coating layer, a light-shielding layer and functional coating layers (C) and (D) were removed and a bare POF was take out. The resultant bare POF (550 mg) was dissolved in acetone (5 ml), and 10 ml of methanol was added thereto to perform reprecipitation. The polymer precipitated was removed and the resultant solution was dried. To the dried residue, methanol (0.5 ml) was added and 1 ml of the ϵ-caprolactam dilute solution (described above) serving as an internal standard substance was added.

Next, the above sample solution was subjected to measurement by gas chromatography (GC/FID) with a flame ionization detector in the above conditions. Based on the chromatograph and the relational expression between the peak area ratio and the lauryl lactam content, the amount of lauryl lactam contained in the sample was determined to obtain the concentration (ppm) of lauryl lactam in the bare POF.

Example 1A

PMMA (refractive index: 1.492) was used as a core material, a copolymer (refractive index: 1.416 to 1.417) composed of 3FM/17FM/MMA/MAA (composition ratio: 51/31/17/1 (% by mass)) was used as the 1st clad material, and a copolymer composed of VdF/TFE/HFP (composition ratio: 43/48/9 (% by mass), refractive index: 1.375, heat of crystal fusion (OH): 14 mJ/mg) was used as the 2nd clad material. These polymers were melted and supplied to a spinning head of 220° C. After composite spinning was performed by using a concentric composite nozzle, the polymer was stretched double in the fiber-axis direction in a hot-air heating furnace of 140° C. to obtain a bare POF of 1 mm in diameter having clads each having a thickness of 10 μm. The transmission loss of the resultant bare POF at a wavelength of 650 nm was as satisfactory as 130 dB/km.

The periphery of the bare POF prepared was coated with commercially available nylon 12 (trade name: DAIAMID-L1640 manufactured by Daicel-Evonik Ltd.) having carbon black (1% by mass) added thereto, as a light-shielding coating layer, by a crosshead cable coating apparatus using a crosshead die set to 210° C. In this manner, a POF primary cable of 1.5 mm in outer diameter having the light-shielding coating layer (thickness: 250 μm) was obtained.

The resultant POF primary cable had a satisfactory initial transmission loss of 134 dB/km at a wavelength 650 nm. The total content of a monomer and an oligomer contained in nylon 12 of the light-shielding coating layer was 1.18% by mass. When a substance taken from a methanol solution after extraction was qualitatively analyzed, the extracted substance included a raw material for nylon 12, i.e., a monomer (12-aminododecanoic acid and w-laurolactam), and a dimer, a trimer, a tetramer, and an oligomer larger than these (aminoaliphatic carboxylic acid compound and cyclic lactam compound) of the monomers.

As a material for a functional coating layer (C), a flame retardancy polybutylene terephthalate (PBT) resin (trade name: Hytrel 7237F manufactured by Du Pont-Toray Co., Ltd.)(resin composition (I)) to which 1.5% by mass of ultramarine blue (colorant) was added was used. As a material for a functional coating layer (D), a nylon resin composition (resin composition (II)) was used which contained 43.5% by mass of nylon 66 (trade name: UBE nylon 2015B manufactured by Ube Industries, Ltd.), 40% by mass of brominated polystyrene (trade name: HP-3010 manufactured by Albemarle Corporation, polystyrene equivalent molecular weight measured by GPC: 50,000), 15% by mass of antimony pentoxide (trade name: Sun Epoch manufactured by Nissan Chemical Industries, Ltd.) and 2.0% by mass of ultramarine blue (colorant). These materials were supplied to extruders adjusted to 235° C. and 275° C., respectively, and simultaneously applied around the periphery of the POF primary cable by use of a crosshead cable coating apparatus using a crosshead die set to 275° C. In this manner, two layers were formed by a single coating process. As a result, a POF secondary cable of 2.3 mm in outer diameter, having the functional coating layer (C) (thickness: 160 μm and the functional coating layer (D)(thickness: 240 μm was obtained.

Table 1 shows the constitution of the POF secondary cable of this Example together with those of other Examples and Comparative Examples. Furthermore, Table 3 shows the composition and physical properties of the resin composition (II) used in this Example, i.e., nylon resin composition PA66 (A).

The resultant POF secondary cable had an initial transmission loss at a wavelength of 650 nm as satisfactory as 134 dB/km. A transmission loss after the heat resistance test was also as satisfactory as 190 dB/km. Furthermore, the result of the bending-elastic modulus test was 15N. The obtained POF cable had high flexibility. The flame retardancy of the resultant POF cable was satisfactory. The evaluation results are shown in Table 2.

Examples 2A to 4A

As shown in Table 1, POF cables were obtained in the same manner as in Example 1A except that the thicknesses of the functional coating layer (C) and the functional coating layer (D) were changed. The resultant POF cables were satisfactory in any one of transmission performance, heat resistance, flexibility and flame retardancy, as shown in Table 2.

Examples 5A to 7A

In Examples 5A to 7A, POF cables were obtained in the same manner as in Example 1 as shown in Table 1 except that the resin composition (II) for use in a functional coating layer (D) was changed to PA66(B) to PA66(D) shown in Table 3, respectively. The resultant POF cables were satisfactory in any one of transmission performance, heat resistance, flexibility and flame retardancy, as shown in Table 2. Slight difference was observed in heat resistance and bending-elastic modulus depending upon the difference in addition amounts of brominated polystyrene and antimony pentoxide serving as a flame retardant.

Examples 8A to 10A

POF cables were obtained in the same manner as in Example 1 except that the resin composition (II) was used as a material for the functional coating layer (C) and the resin composition (I) was used as the functional coating layer (D) and thicknesses were set as shown in Table 1. The resultant POF cables were satisfactory in any one of transmission performance, heat resistance, flexibility and flame retardancy, as shown in Table 2.

Comparative Example 1A

A POF cable was obtained in the same manner as in Example 1A except that the functional coating layer (C) was not provided as shown in Table 1. The resultant POF cable was satisfactory in transmission performance, heat resistance and flame retardancy as shown in Table 2; however, the flexibility was insufficient because the bending-elastic modulus was as high as 26N. The POF cable was difficult to handle during processing, etc.

Comparative Examples 2A and 3A

POF cables were obtained in the same manner as in Example 1A except that the thicknesses of the functional coating layers (C), (D) were changed, as shown in Table 1. Compared to Examples 1A to 4A, the Comparative Examples 2A and 3A having thinner functional coating layers (C) had satisfactory initial transmission performance and heat resistance; however, the bending-elastic modulus and flame retardancy thereof were insufficient, as shown in Table 2.

Comparative Example 4A

A POF cable was obtained in the same manner as in Example 1A except that the functional coating layer (D) was not provided, as shown in Table 1. The resultant POF cable had satisfactory initial transmission performance, flame retardancy and flexibility; however the heat resistance thereof was insufficient, as shown in Table 2.

Comparative Example 5A

A POF cable was obtained in the same manner as in Examples 8A to 10A except that the thicknesses of the functional coating layers (C), (D) were changed as shown in Table 1. The resultant POF cable had satisfactory initial transmission performance, heat resistance and flame retardancy as shown in Table 2; however, the bending-elastic modulus thereof was high and thus the flexibility was insufficient because the functional coating layer (C) was thick and the functional coating layer (D) was thin.

Comparative Example 6A

A POF cable was obtained in the same manner as in Examples 8A to 10A except that the thicknesses of the functional coating layers (C), (D) were changed as shown in Table 1. The resultant POF cable had satisfactory initial transmission performance, flame retardancy and flexibility as shown in Table 2; however the heat resistance thereof was insufficient because the functional coating layer (C) was thin.

Comparative Example 7A

A POF cable was obtained in the same manner as in Example 1A except that, as a material for the light-shielding coating layer, a commercially available nylon 12 resin (trade name: Grilamide L16A manufactured by EMS-CHEMIE, the total content of a monomer and an oligomer: 1.69% by mass) to which 1% by mass of carbon black was added, was used as shown in Table 1. The resultant POF cable had satisfactory initial transmission performance, flame retardancy and flexibility; however, the heat resistance thereof was insufficient, as shown in Table 2.

Comparative Example 8A

A POF cable was obtained in the same manner as in Example 1A except that a copolymer composed of VdF/TFE (composition ratio: 80/20 (% by mass), refractive index: 1.402, heat of crystal fusion ($\Delta H$): 60 mJ/mg) was used as a second clad material, as shown in Table 1. The resultant POF cable had very satisfactory initial transmission performance, flame retardancy and flexibility; however the heat resistance thereof was insufficient, as shown in Table 2.

Example 1B

PMMA (refractive index: 1.492) was used as a core material, a copolymer (refractive index: 1.416 to 1.417) composed of 3FM/17FM/MMA/MAA (composition ratio: 51/31/17/1 (% by mass)) was used as the 1st clad material, and a copolymer composed of VdF/TFE/HFP (composition ratio: 43/48/9 (% by mass), refractive index: 1.375, heat of crystal fusion ($\Delta H$): 14 mJ/mg) was used as the 2nd clad material. These polymers were melted and supplied to a spinning head of 220° C. After composite spinning was performed by using a concentric composite nozzle, the resultant product was stretched double in the fiber-axis direction in a hot-air heating furnace of 140° C. to obtain a bare POF of 1 mm in diameter having clads each having a thickness of 10 μm. The transmission loss of the resultant bare POF at a wavelength of 650 nm was as satisfactory as 130 dB/km.

The periphery of the bare POF prepared was coated with a PBT resin (trade name: Hytrel 4767, manufactured by Du Pont-Toray Co., Ltd.) as a protective coating layer, and a commercially available nylon 12 (trade name: DAIAMID-L1640 manufactured by Daicel-Evonik Ltd.) to which carbon black (1% by mass) was added as a light-shielding coating layer, by a crosshead cable coating apparatus using a crosshead die set to 210° C. In this manner, a POF primary cable of 1.5 mm in outer diameter, having the protective coating layer (thickness: 40 μm and the light-shielding coating layer (thickness: 210 μm) was obtained.

The resultant POF primary cable had an initial transmission loss at a wavelength 650 nm as satisfactory as 134 dB/km. The total content of a monomer and an oligomer contained in nylon 12 of the light-shielding coating layer was 1.18% by mass. A substance taken from a methanol solution after extraction was qualitatively analyzed. The extracted substance included a raw material for nylon 12, i.e., a monomer (12-aminododecanoic acid and ω-lauryllactam), and a dimer, a trimer, a tetramer, and an oligomer larger than these (aminoaliphatic carboxylic acid compound and cyclic lactam compound) of the monomers.

As a material for the functional coating layer (C), a flame retardant polybutylene terephthalate (PBT) resin (trade name: Hytrel 7237F manufactured by Du Pont-Toray Co., Ltd.) (resin composition (I)) to which 2.5% by mass of ultramarine blue (colorant) was added, was used. As a material for the functional coating layer (D), a nylon resin composition (resin composition (II)) was used which contained 43.5% by mass of nylon 66 (trade name: UBE nylon 2015B manufactured by Ube Industries, Ltd.), 40% by mass of brominated polystyrene (trade name: HP-3010 manufactured by Albemarle Corporation, polystyrene equivalent molecular weight measured by GPC: 50,000), 15% by mass of antimony pentoxide (trade name: Sun Epoch manufactured by Nissan Chemical Industries, Ltd.) and 1.5% by mass of ultramarine blue (colorant). These materials were supplied to extruders adjusted to 235° C. and 275° C., respectively, and simultaneously applied around the periphery of the POF primary cable by use of a crosshead cable coating apparatus using a crosshead die set to 275° C. In this manner, two layers were formed by a single coating process. As a result, a POF secondary cable of 2.3 mm in outer diameter, having the functional coating layer (C) (thickness: 160 μm and the functional coating layer (D) (thickness: 240 μm was obtained.

Table 4 shows the constitution of the POF secondary cable of this Example together with those of other Example and Comparative Examples. Furthermore, Table 3 shows the composition and physical properties of the resin composition (II) used in this Example, i.e., nylon resin composition PA66 (A).

The resultant POF secondary cable had a satisfactory initial transmission loss, which was 134 dB/km at a wavelength of 650 nm, 84 dB/km at a wavelength of 570 nm and 97 dB/km at a wavelength of 520 nm. A transmission loss after the heat resistance test was also as satisfactory as 185 dB/km at a wavelength of 650 nm, 112 dB/km at a wavelength of 570 nm and 192 dB/km at a wavelength of 520 nm. Furthermore, the result of the bending-elastic modulus test was 15N. The obtained POF cable had high flexibility and satisfactory flame retardancy. The evaluation results are shown in Table 5.

Examples 2B to 4B

POF cables were obtained in the same manner as in Example 1B except that the thicknesses of the functional coating layer (C) and the functional coating layer (D) were changed as shown in Table 4. The resultant POF cables were satisfactory in any one of transmission performance, heat resistance, flexibility and flame retardancy, as shown in Table 2.

Examples 5B to 7B

In Examples 5B to 7B, POF cables were obtained in the same manner as in Example 1B as shown in Table 4 except that the resin composition (II) for use in a functional coating layer (D) was changed to PA66(B) to PA66(D), respectively, as shown in Table 3. The resultant POF cables were satisfactory in any one of transmission performance, heat resistance, flexibility and flame retardancy, as shown in Table 5. Slight difference was observed in heat resistance and bending-elastic modulus depending upon the difference in addition amounts of brominated polystyrene and antimony pentoxide serving as a flame retardant.

Examples 8B to 10B

POF cables were obtained in the same manner as in Example 1B except that the resin composition (II) was used as a material for the functional coating layer (C) and the resin composition (I) was used as the functional coating layer (D), and the thicknesses were set as shown in Table 4. The resultant POF cables were satisfactory in any one of transmission performance, heat resistance, flexibility and flame retardancy as shown in Table 5. Particularly in Example 9B, as shown in Table 6, the amount of lauryl lactam migrating into the bare POF after the heat resistance test was low. The transmission-loss values at a wavelength of 520 nm, 570 nm and 650 nm were confirmed to be satisfactory.

Examples 11B to 14B

POF cables were obtained in the same manner as in Example 1B except that the resins shown in Table 1B were used as materials for the protective coating layer. The resultant POF cables were satisfactory in any one of transmission performance, heat resistance, flexibility and flame retardancy, as shown in Table 5. Slight difference was observed in heat resistances depending upon the type of material for the protective coating layer.

Comparative Example 1B

A POF cable was obtained in the same manner as in Example 1B except that the functional coating layer (C) was not provided as shown in Table 4. The resultant POF cable was satisfactory in initial transmission performance, heat resistance and flame retardancy, as shown in Table 5. Furthermore, as shown in Table 6, the amount of lauryl lactam migrating into the bare POF after the heat resistance test was low and transmission-loss values at a wavelength of 520 nm, 570 nm and 650 nm were low. However, the flexibility was insufficient because the bending-elastic modulus was as high as 25N.

Comparative Examples 2B to 3B

POF cables were obtained in the same manner as in Example 1B except that the thicknesses of the functional coating layers (C), (D) were changed as shown in Table 4. In comparative Examples 2B and 3B having thinner functional coating layers (C) compared to Examples 1B to 4B, the initial transmission performance and heat resistance were sufficient; however, the bending-elastic modulus and flame retardancy were insufficient, as shown in Table 5.

Comparative Example 4B

A POF cable was obtained in the same manner as in Example 1B except that the functional coating layer (D) was not provided as shown in Table 4. The resultant POF cable had satisfactory initial transmission performance, flame retardancy and flexibility but insufficient heat resistance, as shown in Table 5.

Comparative Example 5B

A POF cable was obtained in the same manner as in Examples 8B to 10B except that the thicknesses of the functional coating layers (C), (D) were changed as shown in Table 4. The resultant POF cable had satisfactory initial transmission performance, heat resistance and flame retardancy as shown in Table 5; however, the bending-elastic modulus thereof was high and thus the flexibility was insufficient because the functional coating layer (C) was thick and the functional coating layer (D) was thin.

Comparative Example 6B

A POF cable was obtained in the same manner as in Examples 8B to 10B except that the thicknesses of the functional coating layers (C), (D) were changed as shown in Table 4. The resultant POF cables had satisfactory initial transmission performance, flame retardancy and flexibility as shown in Table 5; however the heat resistance was insufficient because functional coating layer (C) was thin.

Comparative Example 7B

A POF cable was obtained in the same manner as in Example 1B except that a commercially available nylon 12 resin (trade name: Grilamide L16A manufactured by EMS-CHEMIE, the total content of a monomer and an oligomer: 1.69% by mass) to which 1% by mass of carbon black was added, was used as a material for the light-shielding coating layer, as shown in Table 4. The resultant POF cable had satisfactory initial transmission performance, flame retardancy and flexibility but insufficient heat resistance, as shown in Table 5.

Comparative Example 8B

A POF cable was obtained in the same manner as in Example 1B except that a copolymer composed of VdF/TFE (composition ratio: 80/20 (% by mass), refractive index: 1.402, heat of crystal fusion (AH): 60 mJ/mg) was used as the second clad layer, as shown in Table 4. The resultant POF cable had satisfactory initial transmission performance, flame retardancy and flexibility but insufficient heat resistance, as shown in Table 5.

Comparative Example 9B

Corresponding to Comparative Example 1A

A POF cable was obtained in the same manner as in Example 1B except that a protective coating layer and a functional coating layer (C) were not provided, as shown in Table 4. The resultant POF cable had satisfactory initial transmission performance and flame retardancy as shown in Table 5; however, a bending-elastic modulus was as high as 26N and flexibility was insufficient. Furthermore, as shown in Table 6, the amount of lauryl lactam migrating into the bare POF after the heat resistance test was large, and transmission-loss values at a wavelength of 520 nm and 570 nm were large.

Reference Example 10

Corresponding to Example 9A

A POF cable was obtained in the same manner as in Example 9B except that a protective coating layer was not provided, as shown in Table 4. The resultant POF cable was satisfactory in initial transmission performance, flame retardancy and flexibility as shown in Table 5. However, as shown in Table 6, the amount of lauryl lactam migrating into the bare POF after the heat resistance test was large, and transmission-loss values at a wavelength of 520 nm and 570 nm were large.

TABLE 1

| | 2nd clad | | | Light-shielding coating layer | | | Functional coating layer (C) | | Functional coating layer (D) | | |
|---|---|---|---|---|---|---|---|---|---|---|---|
| | Composition | Refractive index | ΔH (mJ/mg) | Composition | Melting point (°C.) | Amount of low-molecular weight compound | Composition | Thickness (c) | Composition | Thickness (d) | c/(c+d) |
| Example 1A | VdF/TFE/HFP (48/43/9) | 1.375 | 14 | PA12 (A) | 177 | 1.18% | PBT resin (B) | 160 μm | PA66 (A) | 240 μm | 0.40 |
| Example 2A | VdF/TFE/HFP (48/43/9) | 1.375 | 14 | PA12 (A) | 177 | 1.18% | PBT resin (B) | 200 μm | PA66 (A) | 200 μm | 0.50 |
| Example 3A | VdF/TFE/HFP (48/43/9) | 1.375 | 14 | PA12 (A) | 177 | 1.18% | PBT resin (B) | 300 μm | PA66 (A) | 100 μm | 0.75 |
| Example 4A | VdF/TFE/HFP (48/43/9) | 1.375 | 14 | PA12 (A) | 177 | 1.18% | PBT resin (B) | 320 μm | PA66 (A) | 80 μm | 0.80 |
| Example 5A | VdF/TFE/HFP (48/43/9) | 1.375 | 14 | PA12 (A) | 177 | 1.18% | PBT resin (B) | 320 μm | PA66 (B) | 80 μm | 0.80 |
| Example 6A | VdF/TFE/HFP (48/43/9) | 1.375 | 14 | PA12 (A) | 177 | 1.18% | PBT resin (B) | 320 μm | PA66 (C) | 80 μm | 0.80 |
| Example 7A | VdF/TFE/HFP (48/43/9) | 1.375 | 14 | PA12 (A) | 177 | 1.18% | PBT resin (B) | 320 μm | PA66 (D) | 80 μm | 0.80 |
| Example 8A | VdF/TFE/HFP (48/43/9) | 1.375 | 14 | PA12 (A) | 177 | 1.18% | PA66 (A) | 240 μm | PBT resin (B) | 160 μm | 0.60 |
| Example 9A | VdF/TFE/HFP (48/43/9) | 1.375 | 14 | PA12 (A) | 177 | 1.18% | PA66 (A) | 200 μm | PBT resin (B) | 200 μm | 0.50 |
| Example 10A | VdF/TFE/HFP (48/43/9) | 1.375 | 14 | PA12 (A) | 177 | 1.18% | PA66 (A) | 80 μm | PBT resin (B) | 320 μm | 0.20 |
| Comparative Example 1A | VdF/TFE/HFP (48/43/9) | 1.375 | 14 | PA12 (A) | 177 | 1.18% | — | 0 μm | PA66 (A) | 400 μm | 0.00 |
| Comparative Example 2A | VdF/TFE/HFP (48/43/9) | 1.375 | 14 | PA12 (A) | 177 | 1.18% | PBT resin (B) | 100 μm | PA66 (A) | 300 μm | 0.25 |
| Comparative Example 3A | VdF/TFE/HFP (48/43/9) | 1.375 | 14 | PA12 (A) | 177 | 1.18% | PBT resin (B) | 152 μm | PA66 (A) | 248 μm | 0.38 |
| Comparative Example 4A | VdF/TFE/HFP (48/43/9) | 1.375 | 14 | PA12 (A) | 177 | 1.18% | PBT resin (B) | 400 μm | — | 0 μm | 1.00 |
| Comparative Example 5A | VdF/TFE/HFP (48/43/9) | 1.375 | 14 | PA12 (A) | 177 | 1.18% | PA66 (A) | 300 μm | PBT resin (B) | 100 μm | 0.75 |
| Comparative Example 6A | VdF/TFE/HFP (48/43/9) | 1.375 | 14 | PA12 (A) | 177 | 1.18% | PA66 (A) | 50 μm | PBT resin (B) | 350 μm | 0.13 |
| Comparative Example 7A | VdF/TFE/HFP (48/43/9) | 1.375 | 14 | PA12 (B) | 180 | 1.69% | PBT resin (B) | 160 μm | PA66 (A) | 240 μm | 0.40 |
| Comparative Example 8A | VdF/TFE (80/20) | 1.402 | 60 | PA12 (A) | 177 | 1.18% | PBT resin (B) | 160 μm | PA66 (A) | 240 μm | 0.40 |

TABLE 2

| | Transmission loss | | Flame retardancy test | | Bending-elastic modulus | |
|---|---|---|---|---|---|---|
| | Initial | 105° C. 5000 h later | Rating | Extinction within 30 s (number of accepted samples/total number of test samples) | Rating | Bending-elastic modulus (N/mm) |
| Example 1A | 134 dB/km | 190 dB/km | ○ | 10/10 | ○ | 15 |
| Example 2A | 136 dB/km | 195 dB/km | ○ | 10/10 | ○ | 16 |
| Example 3A | 133 dB/km | 194 dB/km | ○ | 10/10 | ○ | 14 |
| Example 4A | 134 dB/km | 198 dB/km | ○ | 10/10 | ○ | 13 |
| Example 5A | 135 dB/km | 197 dB/km | ○ | 10/10 | ○ | 12 |
| Example 6A | 133 dB/km | 195 dB/km | ○ | 10/10 | ○ | 13 |
| Example 7A | 137 dB/km | 198 dB/km | ○ | 10/10 | ○ | 11 |
| Example 8A | 133 dB/km | 191 dB/km | ○ | 10/10 | ○ | 15 |
| Example 9A | 139 dB/km | 195 dB/km | ○ | 10/10 | ○ | 14 |
| Example 10A | 132 dB/km | 198 dB/km | ○ | 10/10 | ○ | 12 |
| Comparative Example 1A | 133 dB/km | 187 dB/km | ○ | 10/10 | X | 26 |
| Comparative Example 2A | 135 dB/km | 190 dB/km | X | 5/10 | X | 22 |
| Comparative Example 3A | 135 dB/km | 193 dB/km | X | 8/10 | X | 21 |
| Comparative Example 4A | 132 dB/km | 380 dB/km | ○ | 10/10 | ○ | 13 |
| Comparative Example 5A | 132 dB/km | 193 dB/km | ○ | 10/10 | X | 22 |
| Comparative Example 6A | 132 dB/km | 280 dB/km | ○ | 10/10 | ○ | 14 |
| Comparative Example 7A | 137 dB/km | >1000 dB/km | ○ | 10/10 | ○ | 15 |
| Comparative Example 8A | 135 dB/km | >1000 dB/km | ○ | 10/10 | ○ | 15 |

TABLE 3

| Resin composition (II) | Composition ratio and physical property | | | | | | | | |
|---|---|---|---|---|---|---|---|---|---|
| | PA66 (mass %) | BrPSt (mass %) | AnOx (mass %) | Ultramarine blue (mass %) | Melting point (° C.) | Bromine atom content (%) | Crystallinity degree (%) | oxygen transmission rate [cm$^3$·cm/(cm$^2$·sec·Pa)] | Spherocrystal (μm) |
| PA66 (A) | 43.5 | 40.0 | 15.0 | 1.5 | 265 | 27.4 | 45 | $1.5 \times 10^{-10}$ | 10 |
| PA66 (B) | 58.5 | 30.0 | 10.0 | 1.5 | 265 | 20.6 | 45 | $1.3 \times 10^{-10}$ | 9 |
| PA66 (C) | 68.5 | 20.0 | 10.0 | 1.5 | 265 | 13.7 | 45 | $1.6 \times 10^{-10}$ | 10 |
| PA66 (D) | 83.5 | 10.0 | 5.0 | 1.5 | 265 | 6.9 | 45 | $1.5 \times 10^{-10}$ | 10 |

TABLE 4

| | 2nd clad | | | Protective coating layer Material | Light-shielding coating layer | | | Functional coating layer (C) | | Functional coating layer (D) | | c/(c + d) |
|---|---|---|---|---|---|---|---|---|---|---|---|---|
| | Composition | Refractive index | ΔH (mJ/mg) | | Composition | Melting point (° C.) | Amount of low-molecular weight compound | Composition | Thickness (c) | Composition | Thickness (d) | |
| Example 1B | VdF/TFE/HFP (48/43/9) | 1.375 | 14 | PBT resin (A) | PA12 (A) | 177 | 1.18% | PBT resin (B) | 160 μm | PA66 (A) | 240 μm | 0.40 |
| Example 2B | VdF/TFE/HFP (48/43/9) | 1.375 | 14 | PBT resin (A) | PA12 (A) | 177 | 1.18% | PBT resin (B) | 200 μm | PA66 (A) | 200 μm | 0.50 |
| Example 3B | VdF/TFE/HFP (48/43/9) | 1.375 | 14 | PBT resin (A) | PA12 (A) | 177 | 1.18% | PBT resin (B) | 300 μm | PA66 (A) | 100 μm | 0.75 |
| Example 4B | VdF/TFE/HFP (48/43/9) | 1.375 | 14 | PBT resin (A) | PA12 (A) | 177 | 1.18% | PBT resin (B) | 320 μm | PA66 (A) | 80 μm | 0.80 |
| Example 5B | VdF/TFE/HFP (48/43/9) | 1.375 | 14 | PBT resin (A) | PA12 (A) | 177 | 1.18% | PBT resin (B) | 160 μm | PA66 (B) | 240 μm | 0.40 |

TABLE 4-continued

| | 2nd clad | | | Protective coating layer | | | Light-shielding coating layer | | | | | |
|---|---|---|---|---|---|---|---|---|---|---|---|---|
| | | | | | | | | Amount of low-molecular | Functional coating layer (C) | | Functional coating layer (D) | |
| | Composition | Refractive index | ΔH (mJ/mg) | Material | Composition | Melting point (° C.) | weight compound | Composition | Thickness (c) | Composition | Thickness (d) | c/(c + d) |
| Example 6B | VdF/TFE/HFP (48/43/9) | 1.375 | 14 | PBT resin (A) | PA12 (A) | 177 | 1.18% | PBT resin (B) | 160 μm | PA66 (C) | 240 μm | 0.40 |
| Example 7B | VdF/TFE/HFP (48/43/9) | 1.375 | 14 | PBT resin (A) | PA12 (A) | 177 | 1.18% | PBT resin (B) | 160 μm | PA66 (D) | 240 μm | 0.40 |
| Example 8B | VdF/TFE/HFP (48/43/9) | 1.375 | 14 | PBT resin (A) | PA12 (A) | 177 | 1.18% | PA66 (A) | 240 μm | PBT resin (B) | 160 μm | 0.60 |
| Example 9B | VdF/TFE/HFP (48/43/9) | 1.375 | 14 | PBT resin (A) | PA12 (A) | 177 | 1.18% | PA66 (A) | 200 μm | PBT resin (B) | 200 μm | 0.50 |
| Example 10B | VdF/TFE/HFP (48/43/9) | 1.375 | 14 | PBT resin (A) | PA12 (A) | 177 | 1.18% | PA66 (A) | 80 μm | PBT resin (B) | 320 μm | 0.20 |
| Example 11B | VdF/TFE/HFP (48/43/9) | 1.375 | 14 | PSt resin | PA12 (A) | 177 | 1.18% | PBT resin (B) | 160 μm | PA66 (A) | 240 μm | 0.40 |
| Example 12B | VdF/TFE/HFP (48/43/9) | 1.375 | 14 | Acrylic resin | PA12 (A) | 177 | 1.18% | PBT resin (B) | 160 μm | PA66 (A) | 240 μm | 0.40 |
| Example 13B | VdF/TFE/HFP (48/43/9) | 1.375 | 14 | PVdf | PA12 (A) | 177 | 1.18% | PBT resin (B) | 160 μm | PA66 (A) | 240 μm | 0.40 |
| Example 14B | VdF/TFE/HFP (48/43/9) | 1.375 | 14 | EVAL resin | PA12 (A) | 177 | 1.18% | PBT resin (B) | 160 μm | PA66 (A) | 240 μm | 0.40 |
| Comparative Example 1B | VdF/TFE/HFP (48/43/9) | 1.375 | 14 | PBT resin (A) | PA12 (A) | 177 | 1.18% | — | 0 μm | PA66 (A) | 400 μm | 0.00 |
| Comparative Example 2B | VdF/TFE/HFP (48/43/9) | 1.375 | 14 | PBT resin (A) | PA12 (A) | 177 | 1.18% | PBT resin (B) | 100 μm | PA66 (A) | 300 μm | 0.25 |
| Comparative Example 3B | VdF/TFE/HFP (48/43/9) | 1.375 | 14 | PBT resin (A) | PA12 (A) | 177 | 1.18% | PBT resin (B) | 152 μm | PA66 (A) | 248 μm | 0.38 |
| Comparative Example 4B | VdF/TFE/HFP (48/43/9) | 1.375 | 14 | PBT resin (A) | PA12 (A) | 177 | 1.18% | PBT resin (B) | 400 μm | — | 0 μm | 1.00 |
| Comparative Example 5B | VdF/TFE/HFP (48/43/9) | 1.375 | 14 | PBT resin (A) | PA12 (A) | 177 | 1.18% | PA66 (A) | 300 μm | PBT resin (B) | 100 μm | 0.75 |
| Comparative Example 6B | VdF/TFE/HFP (48/43/9) | 1.375 | 14 | PBT resin (A) | PA12 (A) | 177 | 1.18% | PA66 (A) | 50 μm | PBT resin (B) | 350 μm | 0.13 |
| Comparative Example 7B | VdF/TFE/HFP (48/43/9) | 1.375 | 14 | PBT resin (A) | PA12 (B) | 180 | 1.69% | PBT resin (B) | 160 μm | PA66 (A) | 240 μm | 0.40 |
| Comparative Example 8B | VdF/TFE (80/20) | 1.402 | 60 | PBT resin (A) | PA12 (A) | 177 | 1.18% | PBT resin (B) | 160 μm | PA66 (A) | 240 μm | 0.40 |
| Comparative Example 9B | VdF/TFE/HFP (48/43/9) | 1.375 | 14 | — | PA12 (A) | 177 | 1.18% | — | 0 μm | PA66 (A) | 400 μm | 0.00 |
| Reference Example | VdF/TFE/HFP (48/43/9) | 1.375 | 14 | — | PA12 (A) | 177 | 1.18% | PA66 (A) | 200 μm | PBT resin (B) | 200 μm | 0.50 |

TABLE 5

| | Transmission loss | | | | | | Flame retardancy test | | Bending-elastic modulus | |
|---|---|---|---|---|---|---|---|---|---|---|
| | Initial | | | 105° C. 5000 h later | | | | Extinction within 30 s (number of accepted samples/total number of test samples) | | Bending-elastic modulus (N/mm) |
| | 520 nm | 570 nm | 650 nm | 520 nm | 570 nm | 650 nm | Rating | | Rating | |
| Example 1B | 97 dB/km | 84 dB/km | 134 dB/km | 192 dB/km | 112 dB/km | 185 dB/km | ○ | 10/10 | ○ | 15 |
| Example 2B | 97 dB/km | 86 dB/km | 136 dB/km | 190 dB/km | 125 dB/km | 191 dB/km | ○ | 10/10 | ○ | 16 |
| Example 3B | 98 dB/km | 88 dB/km | 133 dB/km | 240 dB/km | 130 dB/km | 194 dB/km | ○ | 10/10 | ○ | 14 |
| Example 4B | 95 dB/km | 87 dB/km | 134 dB/km | 470 dB/km | 182 dB/km | 198 dB/km | ○ | 10/10 | ○ | 13 |
| Example 5B | 97 dB/km | 84 dB/km | 135 dB/km | 195 dB/km | 120 dB/km | 197 dB/km | ○ | 10/10 | ○ | 13 |
| Example 6B | 96 dB/km | 85 dB/km | 133 dB/km | 198 dB/km | 124 dB/km | 195 dB/km | ○ | 10/10 | ○ | 13 |
| Example 7B | 94 dB/km | 84 dB/km | 137 dB/km | 200 dB/km | 124 dB/km | 198 dB/km | ○ | 10/10 | ○ | 11 |

TABLE 5-continued

|  | Transmission loss | | | | | | Flame retardancy test | | Bending-elastic modulus | |
|---|---|---|---|---|---|---|---|---|---|---|
|  | Initial | | | 105° C. 5000 h later | | | Rating | Extinction within 30 s (number of accepted samples/total number of test samples) | Rating | Bending-elastic modulus (N/mm) |
|  | 520 nm | 570 nm | 650 nm | 520 nm | 570 nm | 650 nm | | | | |
| Example 8B | 96 dB/km | 86 dB/km | 133 dB/km | 182 dB/km | 105 dB/km | 191 dB/km | ○ | 10/10 | ○ | 15 |
| Example 9B | 96 dB/km | 85 dB/km | 139 dB/km | 188 dB/km | 120 dB/km | 193 dB/km | ○ | 10/10 | ○ | 14 |
| Example 10B | 97 dB/km | 86 dB/km | 132 dB/km | 420 dB/km | 181 dB/km | 197 dB/km | ○ | 10/10 | ○ | 12 |
| Example 11B | 96 dB/km | 86 dB/km | 134 dB/km | 270 dB/km | 145 dB/km | 194 dB/km | ○ | 10/10 | ○ | 14 |
| Example 12B | 94 dB/km | 86 dB/km | 131 dB/km | 190 dB/km | 117 dB/km | 189 dB/km | ○ | 10/10 | ○ | 14 |
| Example 13B | 94 dB/km | 86 dB/km | 136 dB/km | 415 dB/km | 131 dB/km | 203 dB/km | ○ | 10/10 | ○ | 15 |
| Example 14B | 97 dB/km | 83 dB/km | 137 dB/km | 204 dB/km | 118 dB/km | 201 dB/km | ○ | 10/10 | ○ | 13 |
| Comparative Example 1B | 96 dB/km | 87 dB/km | 133 dB/km | 165 dB/km | 104 dB/km | 148 dB/km | ○ | 10/10 | X | 25 |
| Comparative Example 2B | 95 dB/km | 87 dB/km | 135 dB/km | 180 dB/km | 103 dB/km | 190 dB/km | X | 4/10 | X | 22 |
| Comparative Example 3B | 95 dB/km | 84 dB/km | 135 dB/km | 193 dB/km | 117 dB/km | 193 dB/km | X | 8/10 | X | 20 |
| Comparative Example 4B | 98 dB/km | 85 dB/km | 132 dB/km | >1000 dB/km | >1000 dB/km | 380 dB/km | ○ | 10/10 | ○ | 13 |
| Comparative Example 5B | 94 dB/km | 84 dB/km | 132 dB/km | 191 dB/km | 115 dB/km | 195 dB/km | ○ | 10/10 | X | 21 |
| Comparative Example 6B | 94 dB/km | 86 dB/km | 132 dB/km | >1000 dB/km | 980 dB/km | 311 dB/km | ○ | 10/10 | ○ | 14 |
| Comparative Example 7B | 94 dB/km | 87 dB/km | 137 dB/km | >1000 dB/km | >1000 dB/km | >1000 dB/km | ○ | 10/10 | ○ | 15 |
| Comparative Example 8B | 97 dB/km | 86 dB/km | 135 dB/km | >1000 dB/km | 950 dB/km | >1000 dB/km | ○ | 10/10 | ○ | 15 |
| Comparative Example 9B | 98 dB/km | 81 dB/km | 133 dB/km | 705 dB/km | 280 dB/km | 187 dB/km | ○ | 10/10 | X | 26 |
| Reference Example | 97 dB/km | 83 dB/km | 133 dB/km | 843 dB/km | 347 dB/km | 195 dB/km | ○ | 10/10 | ○ | 15 |

TABLE 6

|  | Migration amount of lauryl lactam 125° C. 500 h later Concentration in the bare POF | Transmission loss 105° C. 5000 h later | | | Flame retardancy test | | Bending-elastic modulus | |
|---|---|---|---|---|---|---|---|---|
|  | | 520 nm | 570 nm | 650 nm | Rating | Extinction within 30 s (number of accepted samples/total number of test samples) | Rating | Bending-elastic modulus (N/mm) |
| Example 9B | 20 ppm | 188 dB/km | 120 dB/km | 193 dB/km | ○ | 10/10 | ○ | 14 |
| Comparative Example 1B | 20 ppm | 165 dB/km | 104 dB/km | 148 dB/km | ○ | 10/10 | X | 25 |
| Comparative Example 9B | 39 ppm | 705 dB/km | 280 dB/km | 187 dB/km | ○ | 10/10 | X | 26 |
| Reference Example | 32 ppm | 843 dB/km | 347 dB/km | 195 dB/km | ○ | 10/10 | ○ | 15 |

The abbreviations in this Description and the Tables represent the following compounds.

VdF: Vinylidene fluoride,
TFE: Tetrafluoroethylene,
HFP: Hexafluoropropylene,
MMA: Methyl methacrylate,
MAA: Methacryllic acid,
3FM: 2,2,2-Trifluoroethyl methacrylate,
17FM: 2-(Perfluorooctyl)ethyl methacrylate,
PBT resin (A): Polybutylene terephthalate resin (trade name: Hytrel 4767 manufactured by Du Pont-Toray Co., Ltd.),
PBT resin (B): Polybutylene terephthalate resin (trade name: Hytrel 7237F manufactured by Du Pont-Toray Co., Ltd.),
PSt resin: Polystyrene resin (trade name: NIHON POLYSTY G120K manufactured by Japan Polystyrene, Inc.)
Acrylic resin: Copolymer of MMA and butyl acrylate (BA) (composition ratio 80/20% by mass, manufactured by Mitsubishi Rayon Co., Ltd.),
PVdF: Poly vinylidene fluoride resin (trade name: KYNAR710 manufactured by Arkema K.K.),
EVAL resin: Ethylene-vinyl alcohol copolymer (composition ratio 32/68 mol %, trade name: Eval F104 manufactured by Kuraray Co., Ltd.),
PA12(A): Nylon 12 (trade name: Daiamide-L1640 manufactured by Daicel-Evonik Ltd.),
PA12(B): Nylon 12 (trade name: Grilamide L16A manufactured by EMS/CHEMIE),
PA66: Nylon 66 (trade name: UBE nylon 2015B manufactured by Ube Industries, Ltd.)
BrPSt: Brominated polystyrene (trade name: HP-3010 manufactured by Albemarle Corporation),
AnOx: Antimony pentoxide (trade name: Sun Epoch manufactured by Nissan Chemical Industries, Ltd.).

REFERENCE SIGNS LIST

101 Bare plastic optical fiber (Bare POF)
102 Protective coating layer
103 Light-shielding coating layer
104 Functional coating layer (C)
105 Functional coating layer (D)
201 Dice
201a Forefront surface
202 Nipple
203 Channel for coating material
204 Axis line of channel through which bare POF 101 passes
205 Channel for coating material in dice-nipple portion

The invention claimed is:

1. A plastic optical fiber cable comprising:
a bare plastic optical fiber comprising a core and a clad layer formed around the core, the clad layer being formed of one or plural layers; and
a coating layer around the bare plastic optical fiber, wherein
the core comprises polymethyl methacrylate or a copolymer containing a methyl methacrylate unit;
the clad layer comprises a layer comprising a fluorine-containing olefin resin comprising a tetrafluoroethylene unit in at least an outermost layer of the clad layer, the fluorine-containing olefin resin having a heat of crystal fusion of 40 mJ/mg or less as measured using differential scanning calorimetry (DSC);
the coating layer comprises a light-shielding coating layer, a first functional coating layer (C) and a second functional coating layer (D), the light-shielding layer is present on an opposite side from the bare plastic optical fiber, the first functional coating layer (C) is present on the light-shielding layer, and the second functional coating layer (D) is present on the first functional coating layer (C);
the light-shielding coating layer comprises a resin composition comprising at least one nylon resin of nylon 11 and nylon 12, a total content of a monomer and an oligomer of the nylon resin is 1.5% by mass or less;
one of the first functional coating layer (C) and the second functional coating layer (D) comprises a first resin composition (I) and the other comprises a second resin composition (II);
the first resin composition (I) comprises a polybutylene terephthalate resin or an ethylene-vinyl alcohol copolymer;
the second resin composition (II) comprises a nylon resin composition having a crystalline melting point in a range of 240° C. or more and 280° C. or less as measured using differential scanning calorimetry (DSC), and an oxygen transmission rate P ($cm^3 \cdot cm/(cm^2 \cdot sec \cdot Pa)$) as measured employing a method defined in ISO14663-2:1999 (Annex C) at a temperature T (K), said P satisfying the following general formula (1):

$$P < 8 \times 10^{-2} \times \exp(-560/T) \qquad (1),$$

and the nylon resin composition is colorless or colored with an inorganic pigment;
when the first functional coating layer (C) comprises the resin composition (I) and the second functional coating layer (D) comprises the resin composition (II), the thickness c (μm) of the first functional coating layer (C) and the thickness d (μm) of the second functional coating layer (D) satisfy the following general formula (2):

$$0.39 \leq c/(c+d) \leq 0.9 \qquad (2);$$

when the first functional coating layer (C) comprises the resin composition (II) and the second functional coating layer (D) comprises the resin composition (I), the thickness c (μm) of the first functional coating layer (C) and the thickness d (μm) of the second functional coating layer (D) satisfy the following general formula (3):

$$0.15 \leq c/(c+d) \leq 0.7 \qquad (3);$$

a total thickness of the coating layer is 500 μm or more and 660 μm or less; and
a thickness of the light-shielding coating layer is 200 μm or more and 350 μm or less.

2. The plastic optical fiber cable according to claim 1, further comprising a protective coating layer presented between the bare plastic optical fiber and the light-shielding coating layer,
wherein the protective coating layer comprises at least one resin selected from the group consisting of a methyl (meth)acrylate resin, a styrene resin, a vinylidene fluoride homopolymer, a polybutylene terephthalate resin, and a copolymer containing an ethylene unit and a vinyl alcohol unit.

3. The plastic optical fiber cable according to claim 1, wherein the second resin composition (II) comprises nylon 66.

4. The plastic optical fiber cable according to claim 2, wherein the second resin composition (II) comprises nylon 66.

5. The plastic optical fiber cable according to claim 2, wherein a thickness of the protective coating layer is 10 μm or more and 100 μm or less.

6. The plastic optical fiber cable according to claim 2, wherein the thickness of the light-shielding coating layer is 140 μm or more and 300 μm or less.

7. The plastic optical fiber cable according to claim 2, wherein ratio b/a of the thickness b of the light-shielding coating layer to a thickness of the protective coating layer is 1.5 or more and 30 or less.

8. The plastic optical fiber cable according to claim 2, wherein a ratio (b+c+d)/a of the total thickness of the thickness b of the light-shielding coating layer, the thickness c of the first functional coating layer (C) and the thickness d of the second functional coating layer (D) to a thickness a of the protective coating layer is 5.5 or more and 70 or less.

9. The plastic optical fiber cable according to claim 1, wherein an outer diameter of the bare plastic optical fiber is 900 μm or more and 1100 μm or less.

10. A method for transmitting a signal by using the plastic optical fiber cable as recited in claim 1 in combination with a visible light emitting diode having an emission center wavelength in a range of 500 nm or more and 600 nm or less.

11. A method for transmitting a signal by using the plastic optical fiber cable as recited in claim 2 in combination with a visible light emitting diode having an emission center wavelength in a range of 500 nm or more and 600 nm or less.

12. A method for transmitting a signal by using the plastic optical fiber cable as recited in claim 3 in combination with a visible light emitting diode having an emission center wavelength in a range of 500 nm or more and 600 nm or less.

13. A method for transmitting a signal by using the plastic optical fiber cable as recited in claim 4 in combination with a visible light emitting diode having an emission center wavelength in a range of 500 nm or more and 600 nm or less.

* * * * *